United States Patent
Maeda et al.

(10) Patent No.: US 6,359,621 B1
(45) Date of Patent: Mar. 19, 2002

(54) DATA CONVERTING DEVICE FOR ENCODING AND EDITING TIME SERIES DATA AND METHOD THEREOF

(75) Inventors: Yoshiharu Maeda, Kawasaki (JP); Etienne Burdet, Burnaby B.C. (CA); Kuniharu Takayama; Shinya Hosogi, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/019,301

(22) Filed: Feb. 5, 1998

(30) Foreign Application Priority Data

Aug. 27, 1997 (JP) .............................................. 9-230577

(51) Int. Cl.[7] .............................................. G06F 15/00
(52) U.S. Cl. .................................................... 345/473
(58) Field of Search ................................ 345/473, 474, 345/475, 433, 418, 419, 420

(56) References Cited

U.S. PATENT DOCUMENTS

| | | | | |
|---|---|---|---|---|
| 5,053,760 A | * | 10/1991 | Frasier et al. | 345/473 |
| 5,083,201 A | * | 1/1992 | Ohba | 358/105 |
| 5,093,907 A | * | 3/1992 | Hwong et al. | 395/152 |
| 5,347,306 A | * | 9/1994 | Nitta | 345/473 |

* cited by examiner

Primary Examiner—Phu K. Nguyen
(74) Attorney, Agent, or Firm—Staas & Halsey LLP

(57) ABSTRACT

A data converting device collects time series movement data by measuring a movement of a living thing, encodes the movement data, and stores the encoded data in a storage device. Next, the data converting device generates new encoded data by reading and editing the encoded data. The data converting device then restores the movement data from the encoded data, and reproduces the movement of a virtual character on a display device based on the restored data.

23 Claims, 22 Drawing Sheets

DATA CONVERTING DEVICE FOR ENCODING AND EDITING TIME SERIES DATA AND METHOD THEREOF

BACKGROUND OF THE INVENTION

1. Field of the Invention

The present invention relates to a data converting device for encoding time series data such as movement (motion) data of an object, efficiently storing the encoded data, editing encoded data, and reusing the edited data, and a method thereof.

2. Description of the Related Art

In recent years, virtual characters (simply referred to as characters hereinafter) such as a character of a human-being, an animal, etc. have been frequently used in computer graphics (CG), video games, animations, and movies, etc. The demand for expressing various movements such as running, standing-up, etc. by freely moving a character displayed on a screen is on the rise.

To meet such a demand, a technique for generating and editing movement data of a body of a character by using a computer has been developed. Here, the movement data corresponds to, for example, time series data such as joint angles of the body, positions of hands and a head, etc., which are measured, for example, with a movement measurement technique such as a motion capture system, etc.

The method for generating movements of a character appearing on a screen by using a computer includes the following three major types.

(1) the method for generating movements of a character model by developing an algorithm for generating natural movements like a living thing (2) the method for generating still pictures at suitable time intervals with CG, and automatically generating intermediate pictures by adopting a computer in a conventional animation generation process (3) the method for capturing actual movements of a living thing such as a human being as movement data with a measurement device, and making a three-dimensional (3D) character model play back the measured movement data The first method allows various movements to be arbitrarily generated if an algorithm for generating natural movements like a living thing can be developed. Additionally, this method has the great advantage of being able to cope with a change of a physical characteristic such as the body size of a character. However, development of an effective algorithm itself is extremely difficult, and there is the disadvantage of requiring a precise dynamics model of a character. Therefore, an algorithm and a dynamics model for limited movements are only developed in the present situation. More and more studies are needed in order to be able to generate various movements.

The second method is the most frequently used method at present. This method requires an innumerable number of still pictures for respective types of movements, which leads to the requirement of much time and labor. Whether or not to be able to express natural movements like a living thing depends on an ability of an image generator.

With the third method, actual movements of a living thing are measured, and the measured result is played back by using a computer, so that a character is made to make natural movements like the living thing. With this method, however, each actual movement such as walking, running, etc. must be measured and recorded. This is because an unrecorded movement cannot be reproduced.

Accordingly, to make a character make various movements, a large number of pieces of movement data must be measured and recorded beforehand, and a huge storage capacity is required to store the large number of pieces of data. Because the measured movement data depends on the size of a body to be measured, which makes an actual movement, and the situation, the movement data must be again measured if the character or the situation changes. As described above, the third method has the problems that movement data requires a huge storage capacity, and the degree of reusability of the movement data is low.

SUMMARY OF THE INVENTION

An object of the present invention is to provide a data converting device for efficiently storing movement data, and improving its reusability in a playback technique for making a virtual character play back movements based on measured movement data, and a method thereof.

In a first aspect of the present invention, the data converting device is implemented by using a computer, and comprises an approximating unit and a storing unit. The data converting device stores time series movement data obtained by measuring a movement of an arbitrary object including an arbitrary living thing, and performs information processing by using the movement data.

The approximating unit approximately represents the movement data with a weighted addition of arbitrary basis functions, and generates a weighting coefficient array of the weighted addition. The storing unit stores the weighting coefficient array as code data corresponding to the movement data.

The approximating unit approximately represents the movement data obtained with the weighted addition by using a smooth and local basis function such as a B-spline function. Additionally, the approximating unit stores the weighting coefficient of each basis function as a discrete code representing the movement data in the storing unit.

If the weighted addition of the basis functions is performed by using the code data stored in the storing unit as weighting coefficients, the original movement data can be easily restored. The shape of the basis function is predetermined, and does not change depending on the shape of input movement data. Therefore, if the data representing a set of required basis functions is stored, it can be used for restoring arbitrary movement data.

Normally, the data of the weighting coefficient array can be represented by an amount of data which is much smaller than that of measured movement data. Accordingly, the storage capacity can be significantly reduced in comparison with the case in which the movement data is stored unchanged.

In a second aspect of the present invention, the data converting device is implemented by using a computer, and comprises a storing unit, an encoding unit, an editing unit, a restoring unit, and an outputting unit. The data converting device performs information processing for outputting images of a virtual character by using time series movement data obtained by measuring a movement of an arbitrary object.

The encoding unit generates code data by encoding the movement data. The storing unit stores the code data. The editing unit extracts the code data from the storing unit, edits the data, and generates new code data. The restoring unit restores movement data corresponding to the new code data. The outputting unit generates images of a character using the restored movement data, and outputs the generated images.

DESCRIPTION OF THE PREFERRED EMBODIMENT

Figure 1:
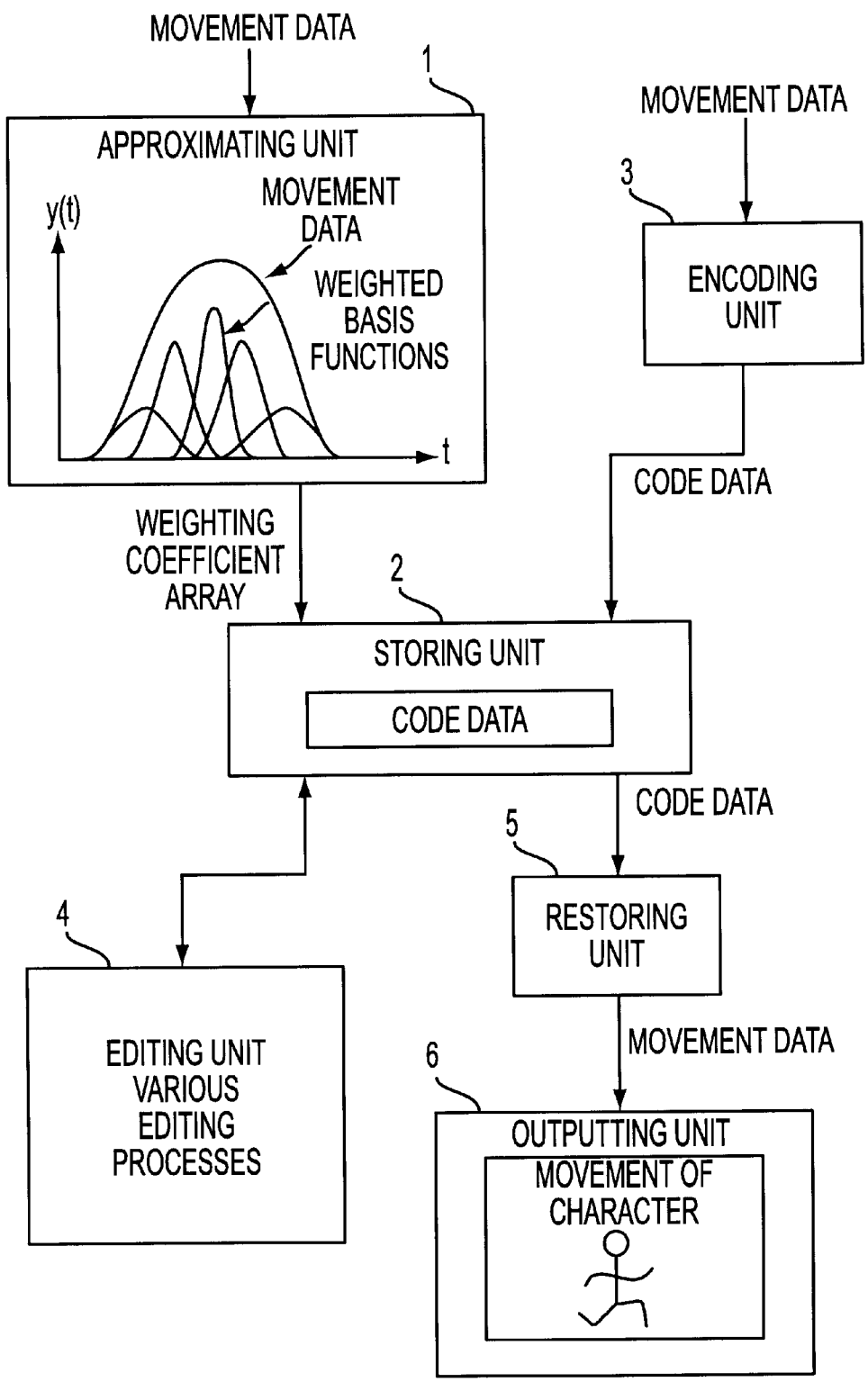
FIG. 1 is block diagram showing the principle of a data converting device according to the present invention.

Provided below is the explanation about the details of a preferred embodiment according to the present invention, by referring to the drawings.

FIG. 1 is a block diagram showing the principle of a data converting device according to the present invention. The data converting device shown in FIG. 1 includes data converting devices according to first and second principles.

The data converting device according to the first principle is implemented by using a computer, and comprises an approximating unit 1 and a storing unit 2. This converting device stores time series movement data obtained by measuring a movement of an arbitrary object including an arbitrary living thing, and performs information processing using the movement data.

The approximating unit 1 approximately represents the movement data with a weighted addition of arbitrary basis functions, and generates a weighting coefficient array of the weighted addition. The storing unit 2 stores the weighting coefficient array as the code data corresponding to the movement data.

The approximating unit 1 approximately represents the movement data using a curve obtained with the weighted addition, for example, by using a smooth and local basis function such as a B-spline function. Additionally, the approximating unit 1 stores the weighting coefficient of each basis function as the discrete code representing the movement data in the storing unit 2.

If the weighted addition of basis functions is performed by using the code data stored in the storing unit 2 as the weighting coefficients, the original movement data can be easily restored. The shape of the basis function is predetermined, and does not change depending on the shape of input movement data. Therefore, if the data representing a set of required basis functions is stored, it can be used for restoring arbitrary movement data.

Normally, a weighting coefficient array can be represented by an amount of data which is much smaller than that of measured movement data. Accordingly, a storage capacity can be significantly reduced in comparison with the case in which the movement data is stored unchanged.

The data converting device according to the second principle is implemented by using a computer, and comprises a storing unit 2, an encoding unit 3, an editing unit 4, a restoring unit 5, and an outputting unit 6. This data converting device performs information processing for outputting images of a virtual character by using time series movement data obtained by measuring a movement of an arbitrary object.

The encoding unit 3 generates code data by encoding the movement data. The storing unit 2 stores the code data. The editing unit 4 extracts the code data from the storing unit 2, edits the data, and generates new code data. The restoring unit 5 restores the movement data corresponding to the new code data. The outputting unit 6 generates images of the character by using the restored movement data, and outputs the images.

The encoding unit 3 encodes the movement data, reduces the amount of data, and stores the data whose amount is reduced with a method similar to that of the above described approximating unit 1 according to the first principle. The editing unit 4 changes the code data by performing editing processes such as a coordinate transformation, time conversion, space conversion, division, connection, fusion, manual adjustment of a weighting coefficient, and a conversion using dynamics. With these processes, new code data representing movements different from those of the original movement data are generated.

The restoring unit 5 performs a process reverse to the encoding process for the so generated new code data, and generates the corresponding new movement data. The outputting unit 6 generates moving pictures for representing the movements of a character based on the movement data, and outputs the generated moving pictures. These processes allow the character to make the movements different from those of the input movement data, thereby improving the reusability of the movement data.

Figure 7:
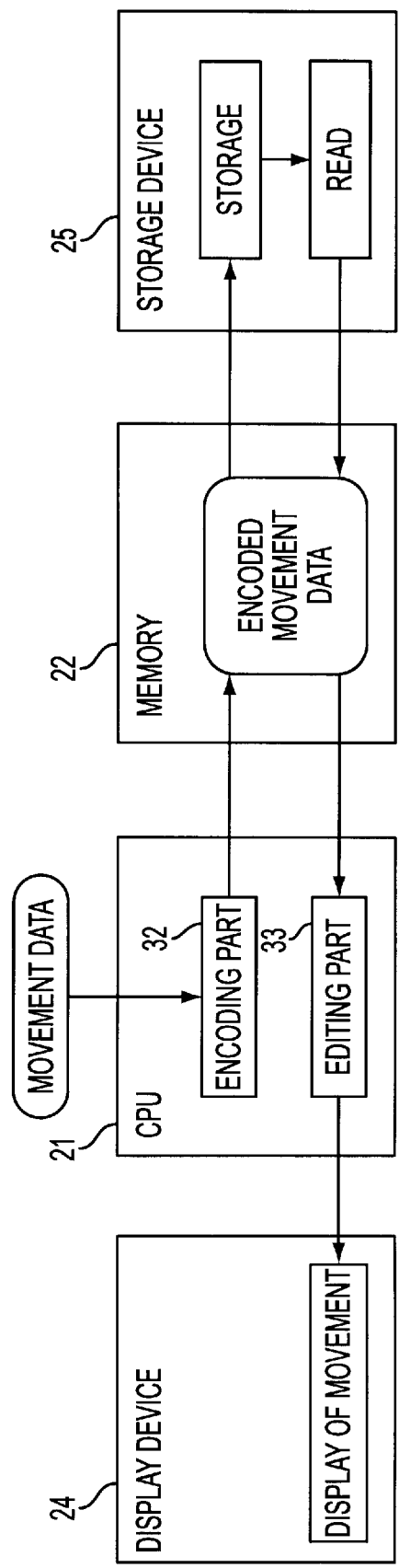
FIG. 7 is a schematic diagram showing the configuration of the data converting device.

For example, the approximating unit 1, the encoding unit 3, the editing unit 4, and the restoring unit 5, which are shown in FIG. 1, correspond to a CPU (Central Processing Unit) 21 and a memory 22, which are shown in FIG. 7 and will be described later; the storing unit 2 corresponds to an external storage device 25; and the outputting unit 6 corresponds to a display device 24'.

According to the present invention, movement data is encoded for being efficiently stored, and the encoded movement data is edited in order to improve its reusability. Here, the encoded movement data is the code data resulting from encoding movement data, which is one type of time series data, with the method according to the present invention.

Figure 2:
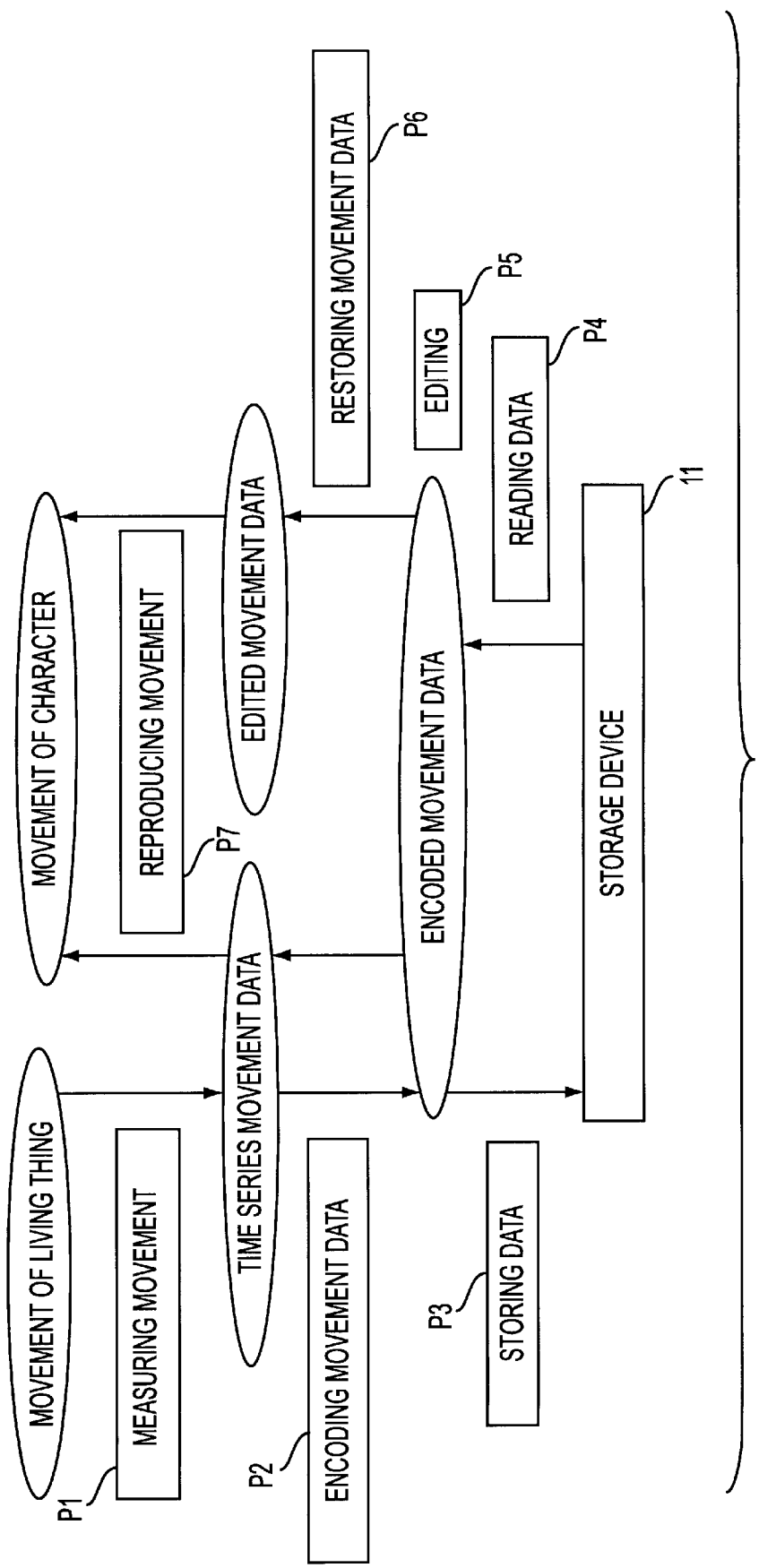
FIG. 2 is a schematic diagram showing a process of movement data.

FIG. 2 shows the processes from the measurement of a movement till the reproduction of the movement, which is performed by the data converting device according to the preferred embodiment of the present invention. This data converting device captures an actual movement of a living thing such as a human being by using a measurement device, and makes a character model appearing on a display screen play back the movement. This process includes the measurement process of a movement (P1), encoding process of movement data (P2), storage process of encoded movement data (P3), read process of the encoded movement data (P4), editing process of the encoded movement data (P5), restoration process from the encoded movement data to the movement data (P6), and the playback process of the movement of a character (P7).

The data converting device according to the present invention is characterized by the encoding process of movement data, editing process of encoded movement data, and restoring process of the movement data. With the encoding process P2, the movement data is encoded in order to overcome the problem of requiring a huge storage capacity by efficiently storing the movement data. With the editing process P5, the encoded data is edited in order to improve its reusability. This editing process allows a coordinate transformation, connection, division, deformation, translation, etc. of the movement data. For the restoration process P6, the process reverse to the process P2 is performed in order to restore movement data.

For the other processes P1, P3, P4, and P7, existing techniques can be used. Here, the explanations about the processes P1 through P7 are briefly provided.

Measurement of Movement (P1)

Various method have been developed for measuring a movement of a body such as a human being, etc. For example, the following measurement methods can be cited. (Masaaki Mochimaru: Trend and Problem of Movement Measurement Technique, Bio-mechanism Society Report, Vol.20, No.1, pp.23–32, 1996)
(a) electrical angle measurement method using a goniometer
(b) opto-electronic measurement method using a video camera, etc.
(c) method using a magnetic sensor
(d) method using an accelerometer or an ultrasonic sensor Which of the above described methods is used depends on a measurement target, a utilization field, etc. Whichever method is used, however, movement data to be measured becomes time series data obtained by recording joint angles and the positions of particular parts of a body at predetermined sampling time intervals.

Encoding Operation of Movement Data (P2)

When a character is made to perform various movements by playing back measured data, a number of pieces of movement data must be measured and stored beforehand. To store the movement data including a number of movements, a huge storage capacity is required. Therefore, according to the present invention, the movement data is compressed by being encoded, thereby efficiently storing the movement data. With this process, the storage capacity required for recording a number of pieces of movement data can be reduced.

The encoding process is performed by approximately representing the movement data measured as time series data with a weighted addition of smooth and local basis functions, and recording only its weighting coefficient array.

Figure 3:
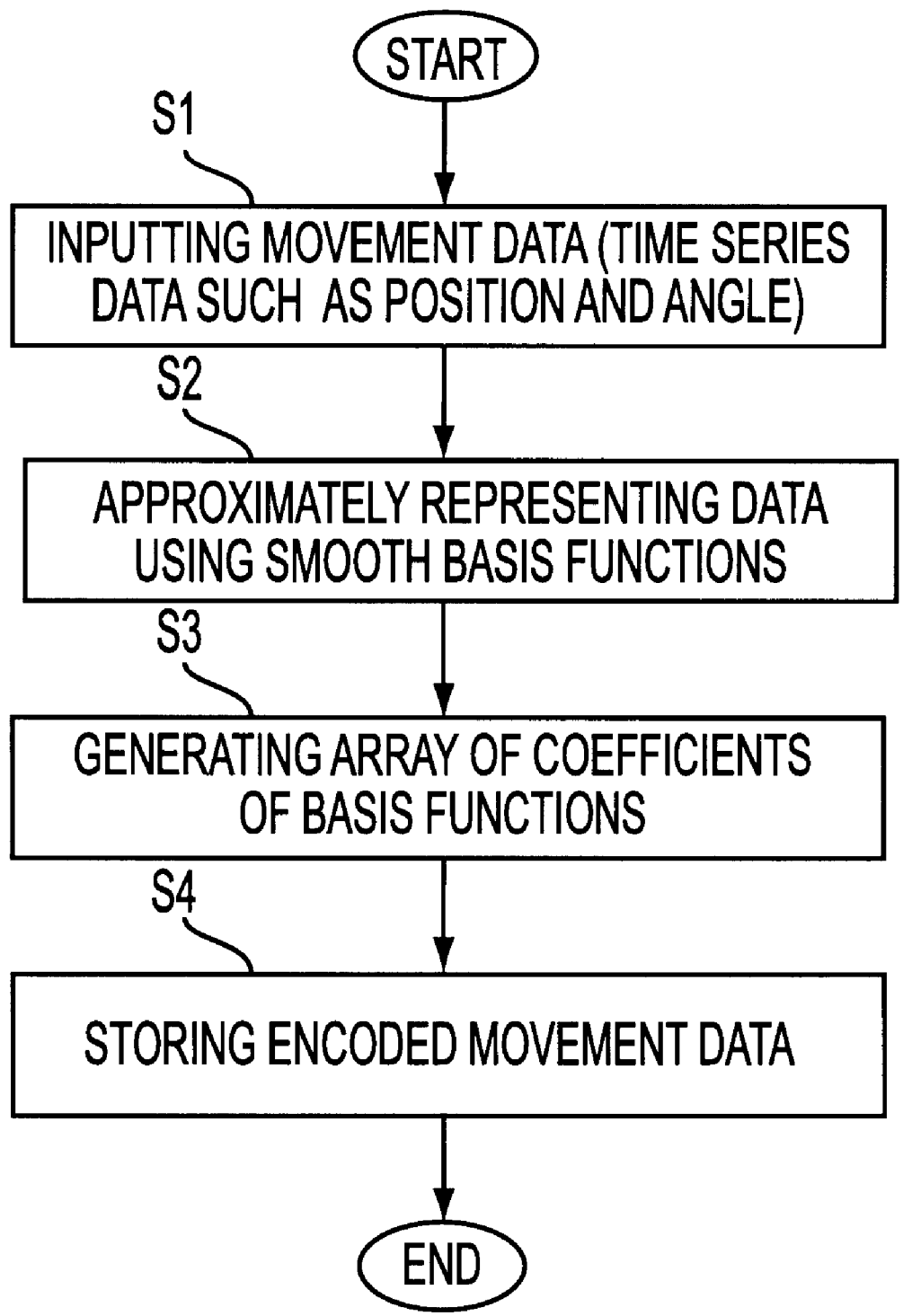
FIG. 3 is a flowchart showing the outline of an encoding process.

FIG. 3 is a flowchart showing the encoding process of movement data. The data converting device is first input with the movement data measured at suitable sampling time intervals (step S1), and approximately represents the movement data by using smooth and local basis functions (step S2). Next, the data converting device generates the weighting coefficient array of the basis functions (step S3), stores the array as encoded movement data (step S4), and terminates the process. This encoded movement data is stored in the storage device 11 of FIG. 2.

Here, assume that the sampling time interval of the measurement process is $\delta t$[sec], and the time interval of the basis functions for performing approximate representation is $\Delta t = n\delta t$[sec]. With this encoding process, the amount of data storage can be reduced to $1/n$. Assuming that $\delta t = 0.01$[sec] and $\Delta t = 0.1$[sec], the amount of data is reduced to 1/10.

Figure 4:
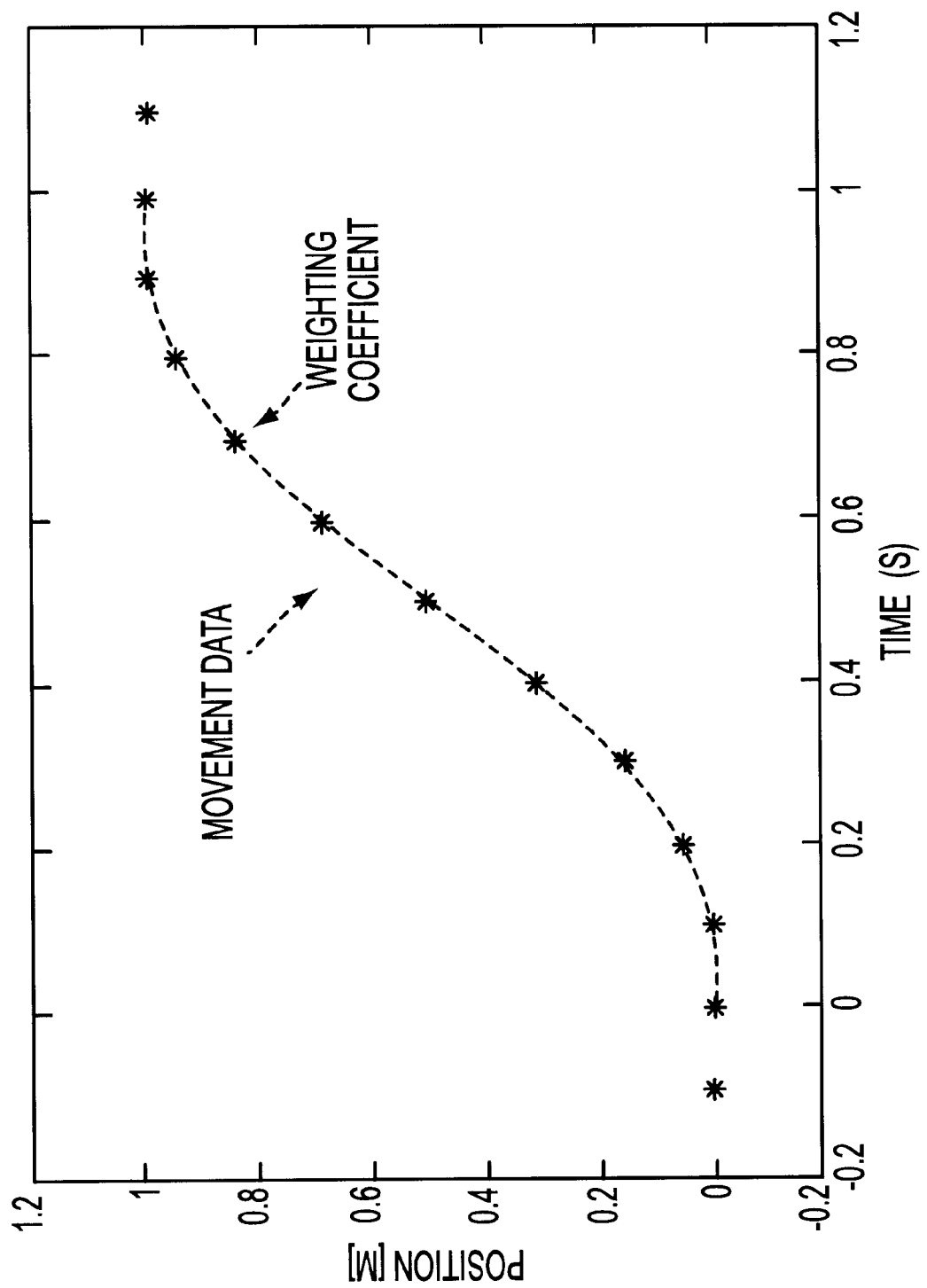
FIG. 4 shows first movement data.

The graph shown in FIG. 4 exemplifies the encoding process of movement data. In this figure, a curve represents an actual movement trajectory of a measurement target, and dots on the curve represents the values of the positional data measured at regular sampling time intervals. The time series data obtained by recording these values together with time indices is the movement data. Additionally, the dots marked with "x" correspond to the weighting coefficients of respective basis functions, and the array of the weighting coefficients becomes encoded movement data.

Storage and Extraction of Encoded Movement Data (P3 and P4)

The encoded movement data is represented by a weighting coefficient array of local basis functions, that is, an array whose elements are numbers. It is easy to store the weighting coefficient array in the storage device 11 such as a hard disk, etc., and to extract the array from the storage device 11.

Editing Process of Movement Data (P5)

The editing process of movement data is implemented in order to improve the reusability of the movement data. The editing process is performed not for the time series movement data itself, but for the encoded movement data. Improvement of the data reusability has also the advantage that the storage capacity of the movement data is reduced.

The editing process performed for the encoded movement data includes, for example, the following capabilities.
(a) coordinate transformation (kinematic transformation)
(b) time conversion
(c) space conversion
(d) division, connection, and fusion
(e) manual adjustment of a weighting coefficient
(f) conversion using dynamics Although the details of these editing capabilities will be described later, new movement data can be generated, for example, by using some pieces of movement data as materials with these capabilities. Accordingly, it becomes possible to reproduce various movements from the movement data whose amount is small.

The above described editing process of the encoded movement data is performed interactively with a user via a graphical interface. Therefore, the movement of a character after being edited is immediately displayed on a screen, so that the user can proceed the editing process while visually checking the generated movement.

Restoration Process of Movement Data (P6)

The restoration process from encoded movement data to time series movement data is implemented with the process reverse to the encoding process. That is, the time series movement data can be restored by performing a weighted addition of the above described basis functions using the encoded movement data. At this time, the encoded movement data need not be edited all the time, and the data obtained with the process P2 may be used as it is.

Reproduction Process of Movement (P7)

After the movement data is restored into time series data, a character can be made to play back the movement data if the data is applied to a three-dimensional kinematic model of the character and joint angles, etc. are set up.

Figure 5:
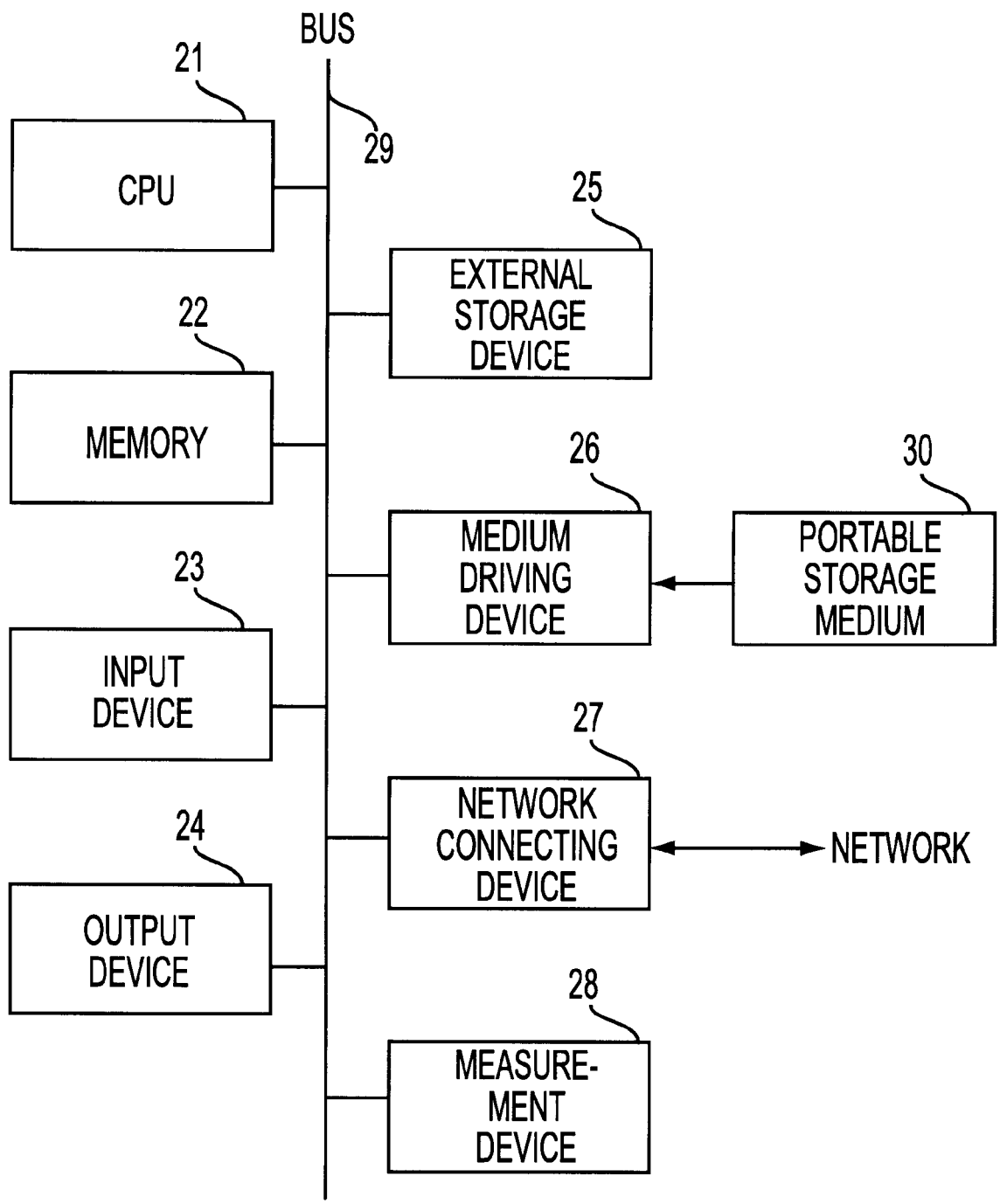
FIG. 5 is a block diagram showing the configuration of an information processing device.

As the data converting device according to this embodiment, for example, an information processing device (computer) shown in FIG. 5 is used. The information processing device shown in FIG. 5 comprises a CPU 21, a memory 22, an input device 23, an output deice 24, an external storage device 25, a medium driving device 26, a network connecting device 27, and a measurement device 28. These constituent elements are interconnected via a bus 29.

The memory 22 stores a program and data used for processing. As the memory 22, for example, a ROM (Read Only Memory), a RAM (Random Access Memory), etc. are used. The CPU 21 performs each of the processes of the data converting device by executing the program using the memory 22.

The input device 23 is, for example, a keyboard, a pointing device, a touch panel, etc., and is used for inputting necessary instructions and information. The output device 24 is, for example, a display, a printer, etc., and is intended to output the movement of a character or an inquiry to a user.

The external storage device 25 is, for example, a magnetic disk device, an optical disk device, a magneto-optical disk device, etc., and is intended to store encoded movement data. The above described program and data may be stored onto the external storage device 25, and loaded into the memory 22 and used depending on need. The external storage device 25 is used as the storage device 11 shown in FIG. 2.

The medium driving device 26 drives a portable storage medium 30, and accesses its stored contents. As the portable storage medium 30, an arbitrary computer-readable storage medium such as a memory card, a floppy disk, a CD-ROM (Compact Disk-Read Only Memory), an optical disk, a magneto-optical disk, etc. is used. The above described program and data may be stored onto the portable storage medium 30, and loaded into the memory 22 and used depending on need.

The network connecting device 27 makes a communication with an external device via an arbitrary network (line) such as a LAN (Local Area Network), etc. In this way, the above described program and data may be received from the external device, and loaded into the memory 22 and used depending on need. The measurement device 28 is, for example, a goniometer, a video camera, a magnetic sensor, an accelerometer, an ultrasonic sensor, etc., and is used for measuring movement data.

Figure 6:
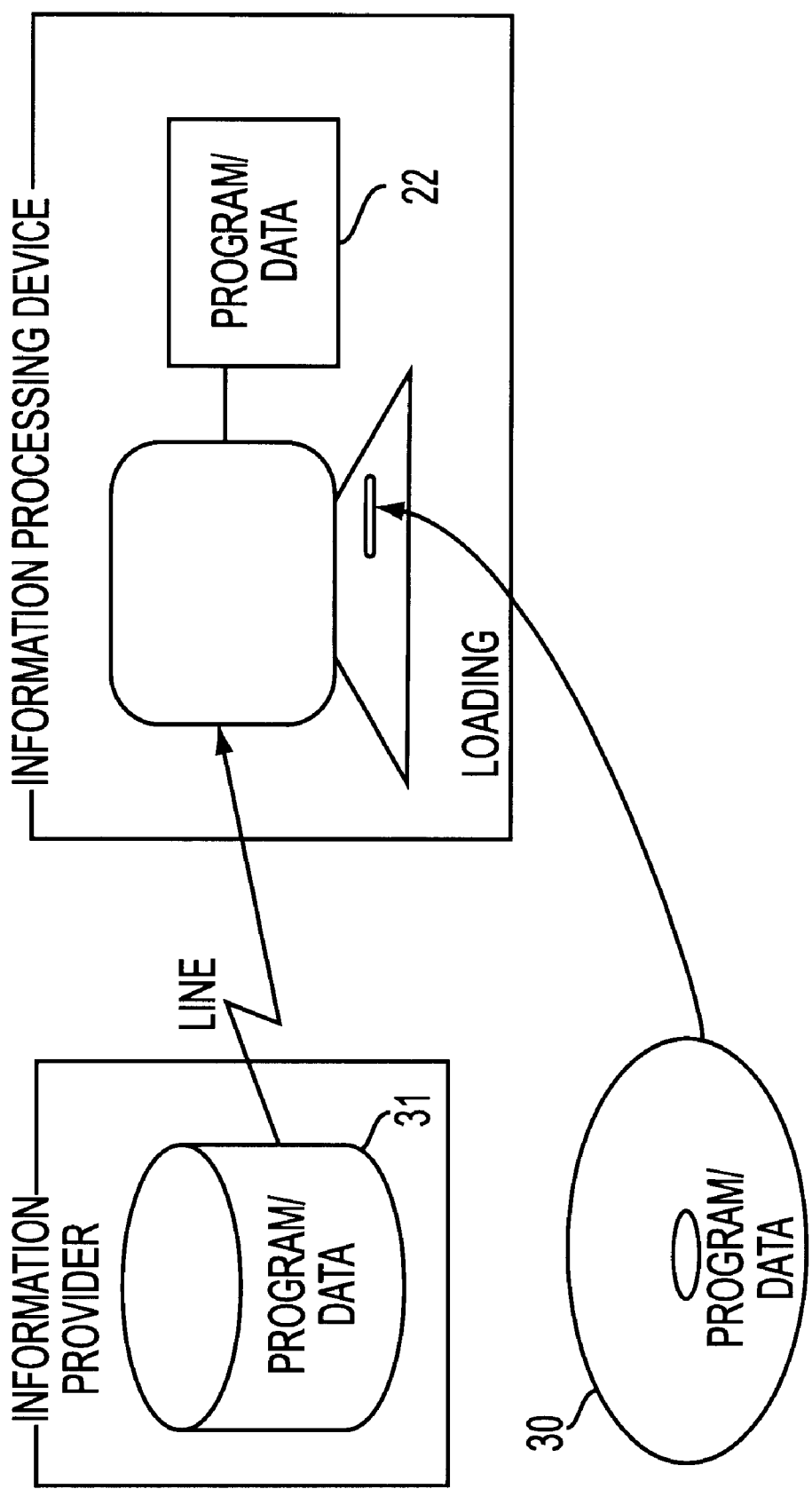
FIG. 6 is a schematic diagram showing storage media.

FIG. 6 shows computer-readable storage media which can provide a program and data to the information processing device shown in FIG. 5. The program and data stored onto a portable storage medium 30 and in an external database 31 are loaded into the memory 22. The CPU 21 then executes the program using the data, and performs necessary processing.

If the configuration of the data converting device which performs the processes shown in FIG. 2 is illustrated by using the information processing device of FIG. 5, it will become the configuration shown in FIG. 7. In this figure, input movement data is encoded in the memory 22, converted into the encoded movement data, and stored in the storage device 25, by an encoding part 32 included in the CPU 21. After the stored encoded movement data is read out, it is edited by an editing part 33 included in the CPU 21 and displayed on the screen of a display device 24'. The display device 24' corresponds to the output device 24 of FIG. 5.

Provided next is the explanation about the specific example of the portion particularly relating to the present invention in the process shown in FIG. 2, that is, the encoding process of movement data and the editing process of encoded movement data, by referring to FIGS. 8 through 22.

With the encoding process of movement data, the movement data measured as time series data is approximately represented with a weighted addition of smooth and local basis functions, and the weighing function array of the basis functions is recognized as the encoded movement data.

According to the studies of measurement and analyses of the movements of a human being, which have been conducted up to now, it is hypothesized that the movements of an arm of a human being are performed in such a manner as they satisfy a certain standard of smoothness.

Here, the standard of smoothness indicates, for example, a minimum "jerk" standard, a standard of the minimum torque change, etc. "jerk" indicates a time differentiation of acceleration. It is therefore adequate to approximately represent movement data with a weighted addition of basis functions having smoothness, as the encoding method according to the present invention. A normalized B-spline function having knots at regular intervals is used as one example of such a basis function.

Provided here is the explanation about the algorithm for calculating the normalized B-spline function having non-overlapping knots at regular intervals. This algorithm is obtained by simplifying the algorithm proposed by de Boor and Cox (C. de Boor: A Practical Guide to Splines. Springer-Verlag, 1978), in order to stably calculate a general B-spline function.

A spline function of degree "k" $S_k(s)=S_k(s; s_1, \ldots, s_p)$, which has "p" non-overlapping real number knots $s=s_1, \ldots, S_p$ ($s_1 < \ldots < S_p$), is defined as a real function which satisfies the following two conditions (T.N.E. GRerille. Ed.: Theory and Applications of Spline Functions. Academic Press, 1969).

The first condition is that $S_k(s)$ is a polynomial of degree "k" about "s" in each section ($s_i, s_{i+1}$) for $i=0, \ldots, p$. The second condition is that $S_k(s)$ belongs to a "$C^{k-1}$" class in a section ($-\infty, +\infty$), that is, derivatives at "j" stages of $S_k(s)$ exists for $j=1, \ldots, k-1$, and is continuous. Note that, however, $s_0=-\infty$ and $s_{p+1}=+\infty$.

The B-spline function is defined as a basis of a spline function, which has a local and minimum carrier. That is, an arbitrary spline function is structured by a linear combination of the corresponding B-spline functions.

By modifying the algorithm proposed by de Boor and Cox, the normalized B-spline function of degree "k" $B_k(s; 0, \ldots, k+1)$, which has the non-overlapping knots $s=0, \ldots, k+1$ at regular intervals can be calculated:

$$B_k(s) = \begin{cases} N_{k-j,k}(s-j), & j \leq s \leq j+1, j=0, \ldots, k \\ 0, & s \leq 0, k+1 \leq s \end{cases} \quad (1)$$

Here, the function $N_{0,k}(S), \ldots, N_{k,k}(S)$ is recurrently defined as follows.

$$\begin{cases} N_{0,0}(s) = 1, \\ N_{0,k}(s) = \frac{1-s}{k} N_{0,k-1}(s), \\ N_{j,k}(s) = \frac{k-j+s}{k} N_{j-1,k-1}(s) + \frac{1+j-s}{k} N_{j,k-1}(s), j = 1, \ldots, k-1 \\ N_{k,k}(s) = \frac{s}{k} N_{k-1,k-1}(s) \end{cases} \quad (2)$$

Additionally, the following relation is satisfied.

$$\sum_{j=0}^{k} N_{j,k}(s) = 1, 0 \leq s \leq 1 \quad (3)$$

At this time, the normalized spline function of degree "k" $S_k$ (s; 1, ..., m+k-1), which has non-overlapping knots s=1, ..., m+k-1 at regular intervals, can be described by suitably selecting a constant $c_{1-k+1}, \ldots, c_{m+k-1}$ as a linear combination of corresponding B-spline functions $B_k$ (s-(1-k)), ..., $B_k$ (s-(m+k-2)):

$$S_k(s) = \sum_{i=l-k+1}^{m+k-1} c_i B_k(s-(i-1)) \quad (4)$$

According to the local nature of the B-spline function represented by the equation (1), the equation (4) can be transformed:

$$S_k(s) = \sum_{i=l-k+1}^{j+1} c_j B_k(s-(i-1)), j \leq s \leq j+1, j = l, \ldots, m+k-2 \quad (5)$$

The equation can be further transformed:

$$S_k(s) = \sum_{i=0}^{k} c_{i+j-k+1} N_{i,k}(s-j), j \leq s \leq j+1, j = l, \ldots, m+k-2 \quad (6)$$

Specifically, if $c_{1-k+1} = \ldots = c_{m+k-1} = 1$, the equation (6) will become the following equation based on the equation (3).

$$S_k(s) = \sum_{i=0}^{k} N_{i,k}(s-j) = 1, j \leq s \leq j+1, j = l, \ldots, m+k-2 \quad (7)$$

Accordingly, the equation results in:

$$S_k(s) = 1, 1 \leq s \leq m+k-1 \quad (8)$$

Provided below are the brief explanation about an approximate representation using a B-spline function of degree "k" having such a nature, and the explanation about the method for encoding movement data using a weighting coefficient of the B-spline function. Provided last is the explanation about the case in which a normalized B-spline function of degree 3 at regular intervals is used, as a specific example.

Let's consider the case in which a certain smooth function $f(t)(0 \leq t \leq T)$ is approximately represented by using normalized B-spline functions at a regular interval $\Delta t$. Here, assume that the variable "t" is digitized at the interval $\Delta t$, and the discrete point is represented as $t = i\Delta t$ ("i" is an integer).

At this time, the function "f(t)" can be approximately represented by using (N+k) B-spline functions of degree "k" $B^{(k)}(t)$, which are arranged at the regular interval $\Delta t$:

$$f(t) \approx \sum_{i=-k}^{N-1} w_i B^{(k)}(t - i\Delta t) = \sum_{i=-k}^{N-1} w_i B_i^{(k)}(t), (0 \leq t \leq T) \quad (9)$$

Note that $B^{(k)}(t)$ is a B-spline function of degree "k". Additionally, $B^{(k)}_i(t)$ is a function obtained by translating $B^{(k)}(t)$ by $i\Delta t$, and is represented by the following equation.

$$B^{(k)}_i(t) = B^{(k)}(t - i\Delta t) \quad (10)$$

Furthermore, "N" must satisfy the following equation.

$$N = T\Delta t \quad (11)$$

$w_i$ (i=-k, ..., N-1) is a coefficient representing the weight of the B-spline function $B^{(k)}_i(t)$.

Figure 8:
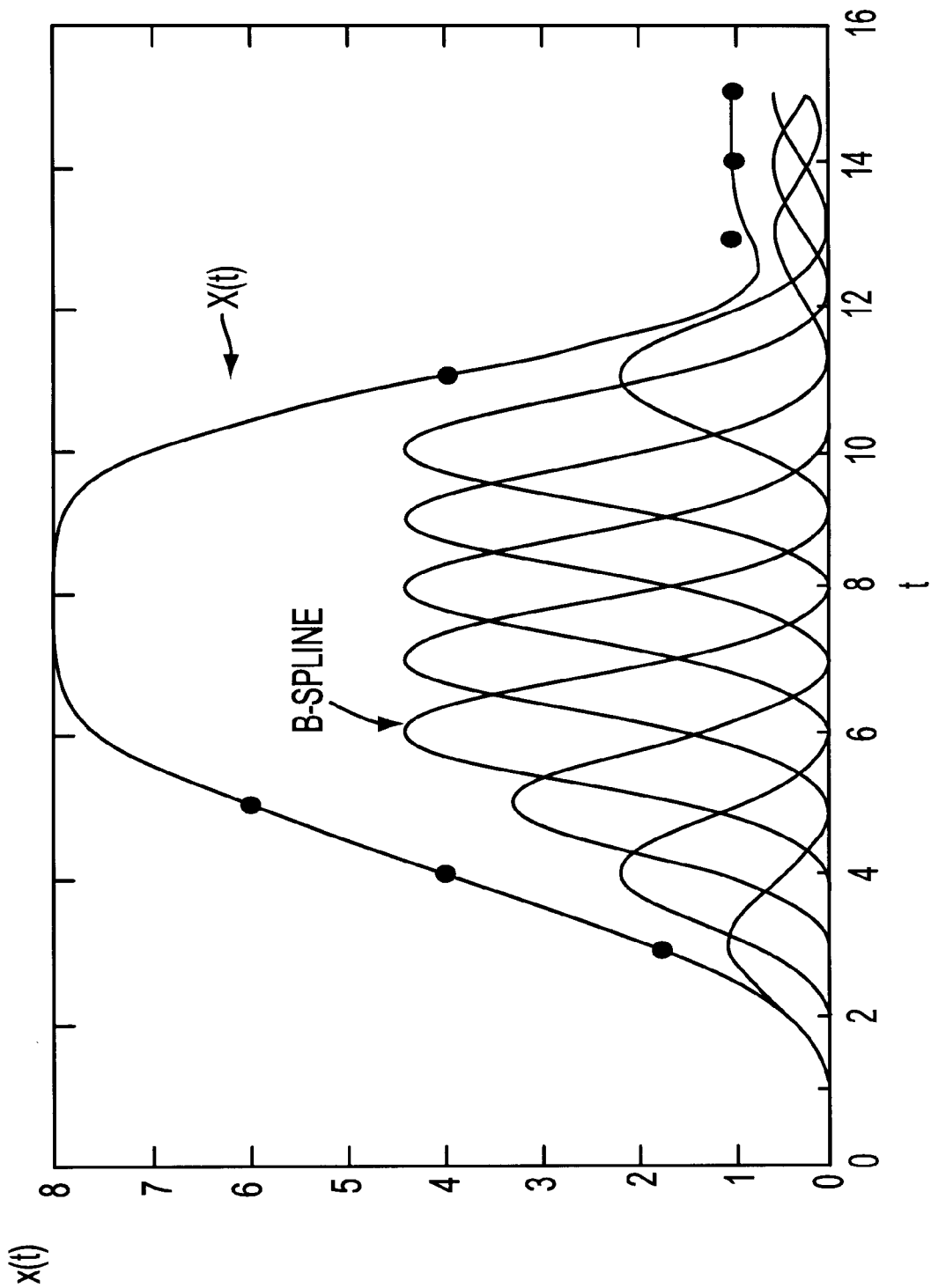
FIG. 8 shows B-spline functions of degree three at regular intervals.

FIG. 8 shows the example in which a function "x(t)" indicating a position is approximately represented by using the B-spline function $B^{(3)}(t)$ of degree three at regular intervals. In this case, the function "x(t)" is represented as a linear combination of some B-spline functions $B^{(3)}_i(t)$.

If the function "f(t)" is an "m" dimensional function, the equation (9) is represented as follows.

$$f(t) \approx \sum_{i=-k}^{N-1} w_i B^{(k)}(t - i\Delta t) = \sum_{i=-k}^{N-1} w_i B_i^{(k)}(t) = Wb^{(k)}(t) \quad (12)$$

wherein $f(t) = [f_1(t), \ldots, f_m(t)]^T$ (13)

(f(t) is an "m"-dimensional vertical vector)

$b^{(k)}(t) = [B^{(k)}_{-k}(t), \ldots, B^{(k)}_{N-1}(t)]^T$ (14)

($b^{(k)}(t)$ is an (N+k) dimensional vertical vector)

$w_i = [w_{i,l}, \ldots, w_{i,m}]^T$ (15)

($w_i$ = an "m"-dimensional vertical vector)

$w = [w_{-k}, \ldots, w_{N-1}]$ (16)

(W is a matrix of m×(N+k))

With the encoding process according to the present invention, the movement data obtained by performing measurement is approximately represented using the B-spline function like the equation (12), and the matrix $w = [w_{-k}, \ldots w_{N-1}]$ of the weighting coefficient of the B-spline functions is defined as the result of encoding the movement data. Provided below is the explanation about the process until $W = [w_{-k}, \ldots, w_{N-1}]$ is obtained from the movement data.

Assume that "m" values such as a joint angle, the position of a particular portion of a body, etc. are measured and recorded with the measurement process of the movement data. Also assume that the trajectory of a movement made by a measurement target is $y(t) \in R^m$ ($0 \leq t \leq T$, "t" is a time), and the results obtained by measuring this movement at a sampling time interval $\delta t$ is $y(0), y(\delta t), y(2\delta t), \ldots, y(M\delta t)$. Remember that the following relations must be satisfied.

$\delta t = \Delta t/n$ (17)

$T = M \cdot \delta t = N \cdot \Delta t$ (18)

The total number of sampling points is (M+1).

According to the equation (12), the movement "y(t)" at a sampling time t=i·δt (i=0, . . . , M) can be approximately represented by using the B-spline functions of degree "k":

$$y(t) \approx \sum_{i=-k}^{N-1} w_i B_i^{(k)}(t) = W b^{(k)}(t), (t = 0, \delta t, \ldots, M\delta t) \quad (19)$$

Consequently, the movement data measured when a certain move is performed at times "0" through "T" can be approximately represented as:

$$Y \approx WA \quad (20)$$

Note that, however, the matrices "Y" (m×(M+1)) and "A" ((N+k)×(M+1)) are defined as follows.

$$Y = [y(0), \ldots, y(M\delta t)] \quad (21)$$
$$= \begin{bmatrix} y_1(0) & \cdots & y_1(M\delta t) \\ \vdots & & \vdots \\ y_m(0) & \cdots & y_m(M\delta t) \end{bmatrix},$$

$$A = [b^{(k)}(0), \ldots, b^{(k)}(M\delta t)] \quad (22)$$
$$= \begin{bmatrix} B_{-k}^{(k)}(0) & \cdots & B_{-k}^{(k)}(M\delta t) \\ \vdots & \ddots & \vdots \\ B_{N-1}^{(k)}(0) & \cdots & B_{N-1}^{(k)}(M\delta t) \end{bmatrix},$$

The matrix "W" is defined by the equation (16).

The matrix "Y" represented by the equation (21) is composed of movement data, while the matrix "A" represented by the equation (22) can be calculated by using the sampling time interval δt and the interval Δt of the B-spline function. Existing methods allow the equation (20) to be solved for the matrix "W" after the matrices "Y" and "A" are substituted for the equation (20). As the existing methods, a method using a pseudo inverse matrix (generalized inverse matrix), a Gaussian elimination method, etc. can be cited.

For example, with the method for using a pseudo inverse matrix, the matrix "W" is obtained by using a pseudo inverse matrix $A^+=A^T (AA^T)^{-1}$ of the matrix "A":

$$W = YA^+ = YA^T (AA^T)^{-1} \quad (23)$$

Figure 9:
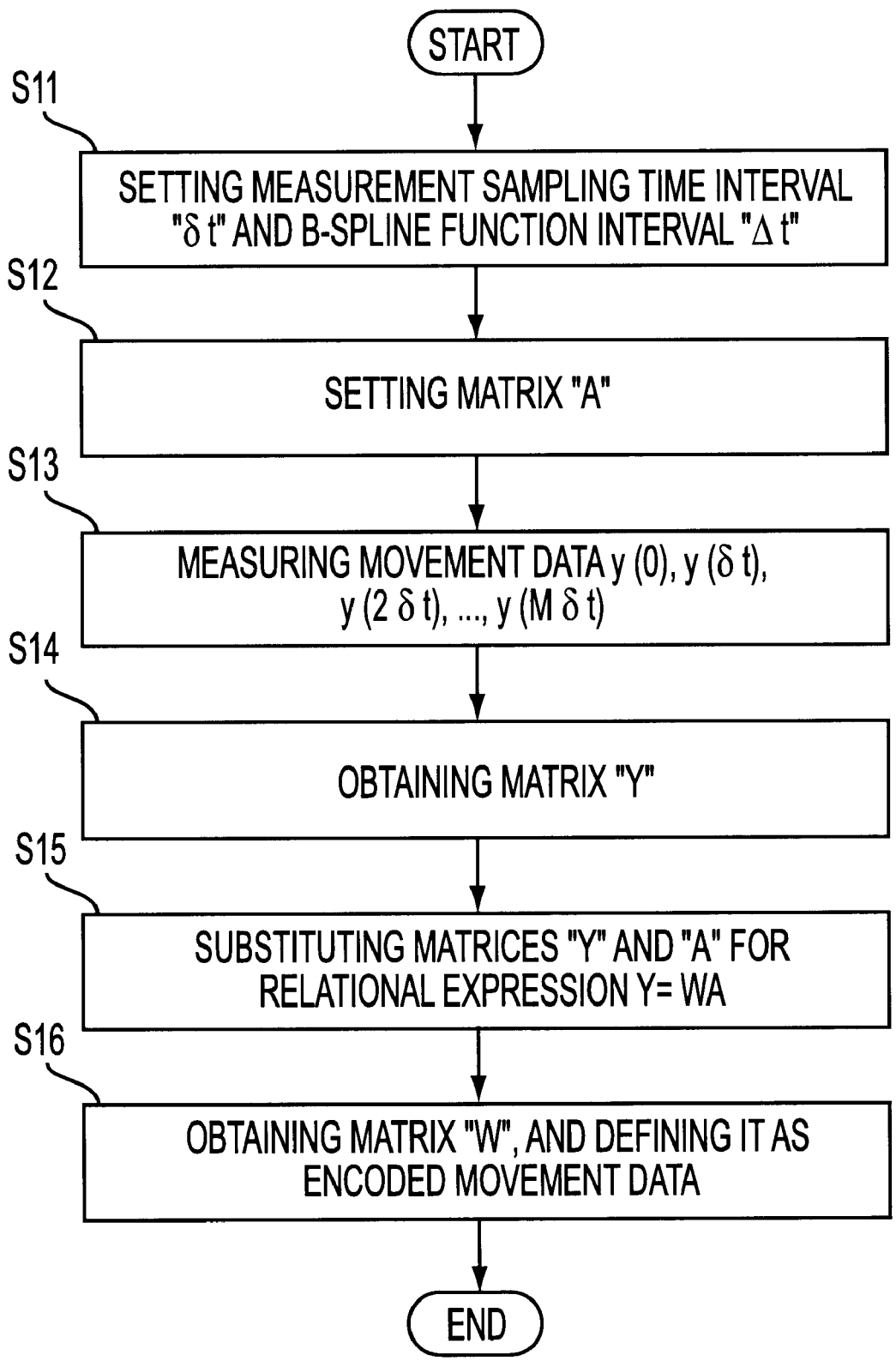
FIG. 9 is a flowchart showing the details of the encoding process.
Figure 10:
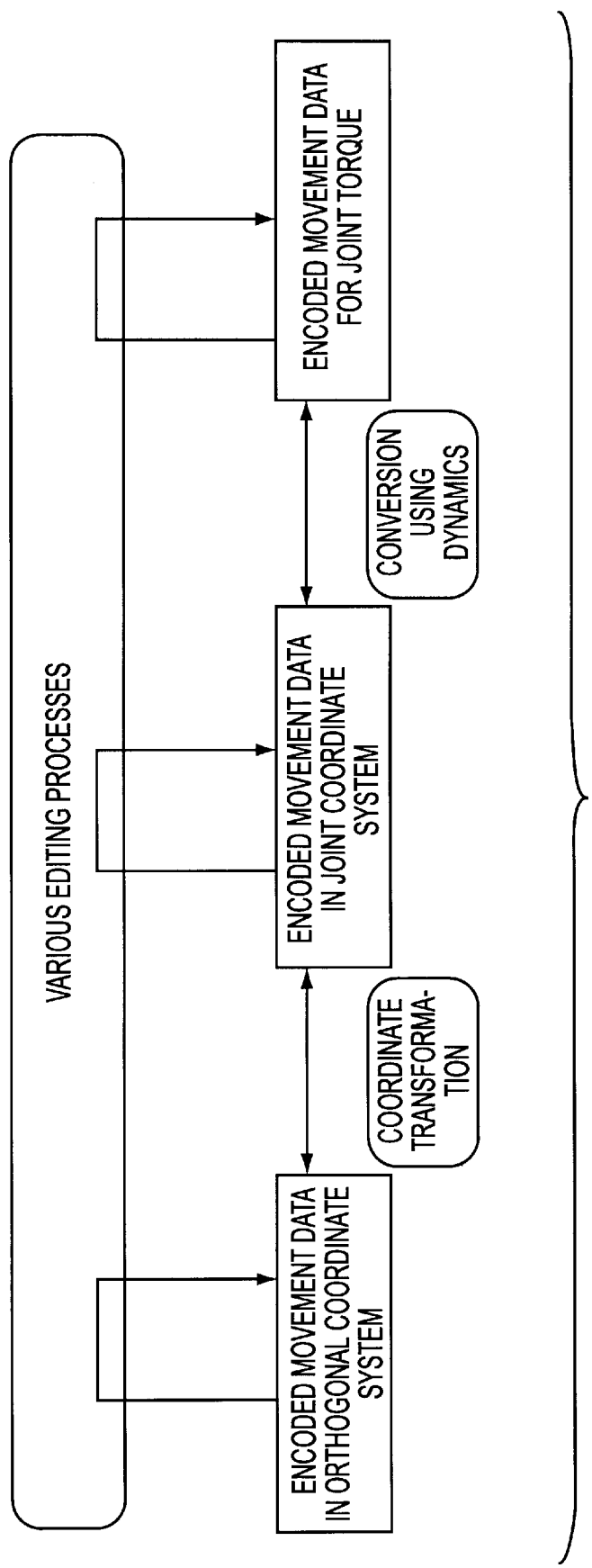
FIG. 10 is a schematic diagram showing a conversion process of encoded movement data.

FIG. 9 is a flowchart showing the details of the encoding process of movement data according to the equation (20). The data converting device first sets the sampling time interval δt specified by a user, and the interval Δt of the B-spline function (step S11). The data converting device then sets each element of the matrix "A" by using these values (step S12).

Next, the data converting device measures the movement data y(0), y(δt), y(2δt), . . . , y(Mδt) at the sampling time interval δt (step S13), and sets each element of the matrix "Y" represented by the equation (21) (step S14). The data converting device then substitutes the matrices "Y" and "A" for the equation (20) (step S15), and obtains the matrix $W=[w_{-k}, \ldots, w_{N-1}]$ by solving this equation (step S16). In this way, the matrix "W" is recognized as the encoded movement data.

Here, the subscript "i" of $w_i$(i=-k, . . . , N-1) indicates not a movement time, but the coefficient vector of the "i"th B-spline function $B^{(k)}_i(t)$. If the equation (17) is satisfied, the amount of movement data can be compressed to 1/n with such an encoding process.

The encoding process according to the present invention employs the approximate representation of the movement data "y(t)" such as a position, a joint angle, etc. using the equation (19). If the equation (19) is differentiated in terms of time, the following equations are obtained.

$$\dot{y}(t) \approx \sum_{i=-k}^{N-1} w_i \dot{B}_i^{(k)}(t) = W \dot{b}^{(k)}(t) \quad (24)$$

$$\ddot{y}(t) \approx \sum_{i=-k}^{N-1} w_i \ddot{B}_i^{(k)}(t) = W \ddot{b}^{(k)}(t) \quad (25)$$

Consequently, if "y(t)" is positional data, the velocity "$\dot{y}^{(t)}$" and the acceleration "$\ddot{y}^{(t)}$" can be represented by using the identical encoded movement data $W=[W_{-k}, \ldots, W_{N-1}]$ according to the equations (24) and (25). That is, if only the matrix "W" is recorded as the encoded movement data, all of the position, velocity, and the acceleration can be reproduced according to the equations (19), (24), and (25). Similarly, if "y(t)" is angular data, an angular velocity, and an angular acceleration can be obtained from the encoded movement data "W" according to the equations (24) and (25).

As described above, with the encoding process using the B-spline function, use of the time differentiation of the B-spline function allows not only the original movement data but also the time-differentiated data to be reproduced from the encoded movement data. Accordingly, a larger number of pieces of data can be reproduced with a smaller storage capacity.

Furthermore, the study of the movements of an arm of a human being reports that the trajectory of a movement can be successfully approximated by using a B-spline function of degree three at regular intervals. (E.Burdet; Algorithms of Human Motor Control and their Implementation in Robotics. PhD thesis No.11692, Eidgenössische Technische Hochschule (ETH)-Zurich, 1996). Provided next is therefore the specific example of the encoding process when the B-spline function of degree three is used.

The normalized B-spline function $B^{(3)}$ (t;0, Δt, 2Δt, 3Δt), which has four non-overlapping knots t=0, Δt, 2Δt, 3Δt at the regular interval Δt, is defined as follows based on the equation (2):

$$B^{(3)}(t) = \begin{cases} N_{3,3}(t), & 0 \le t < \Delta t \\ N_{2,3}(t - \Delta t), & \Delta t \le t < 2\Delta t \\ N_{1,3}(t - 2\Delta t), & 2\Delta t \le t < 3\Delta t \\ N_{0,3}(t - 3\Delta t), & 3\Delta t \le t < 4\Delta t \\ 0, & t < 0, 4\Delta t \le t \end{cases} \quad (26)$$

Note that, however, the function $N_{3-j, 3}$ (t) (j=0, 1, 2, 3) is defined:

$$\begin{cases} N_{0,3}(t) = \frac{1}{6}(1 - (t/\Delta t))^3 \\ N_{1,3}(t) = \frac{1}{6}(4 - 6(t/\Delta t)^2 + 3(t/\Delta t)^3) \\ N_{2,3}(t) = \frac{1}{6}(1 + 3(t/\Delta t) + 3(t/\Delta t)^2 - 3(t/\Delta t)^3) \\ N_{3,3}(t) = \frac{1}{6}(t/\Delta t)^3 \end{cases} \quad (27)$$

Assuming that $t=(j+e)\Delta t (0\leq e \leq 1)$, the equation (19) can be transformed into the following equation based on the equation (26).

$$y((j+e)\Delta t) \approx \sum_{i=-3}^{N-1} c_i B^{(3)}((j+e-i)\Delta t) \qquad (28)$$

$$= c_{j-3} B^{(3)}((e+3)\Delta t) + c_{j-2} B^{(3)}((e+2)\Delta t)) +$$

$$c_{j-1} B^{(3)}((e+1)\Delta t) + c_j B^{(3)}(e\Delta t)$$

$$= c_{j-3} N_{0,3}(e\Delta t) + c_{j-2} N_{1,3}(e\Delta t) + c_{j-1} N_{2,3}(e\Delta t) +$$

$$c_j N_{3,3}(e\Delta t)$$

$$= c_{j-3} b_0(e) + c_{j-2} b_1(e) + c_{j-1} b_2(e) + c_j b_3(e)$$

Note that, however, the function $b_i(s)$ (i=0, 1, 2, 3, $0\leq s \leq 1$) is defined:

$$\begin{cases} b_0(s) = \frac{1}{6}(1-s)^3 \\ b_1(s) = \frac{1}{6}(4-6s^2+3s^3) \\ b_2(s) = \frac{1}{6}(1+3s+3s^2-3s^3) \\ b_3(s) = \frac{1}{6}s^3 \end{cases} \qquad (29)$$

In this way, if the B-spline function of degree three at regular intervals is used, the matrix "A" can be easily calculated:

$$A = \begin{bmatrix} D & 0 & \cdots & 0 \\ 0 & D & \ddots & \vdots \\ \vdots & \ddots & \ddots & 0 \\ 0 & \cdots & 0 & D \end{bmatrix}, \qquad (30)$$

$$D = \begin{bmatrix} b_0(0) & b_0(\delta t) & \cdots & b_0(\Delta t) \\ b_1(0) & b_1(\delta t) & \cdots & b_1(\Delta t) \\ b_2(0) & b_2(\delta t) & \cdots & b_2(\Delta t) \\ b_3(0) & b_3(\delta t) & \cdots & b_3(\Delta t) \end{bmatrix} \qquad (31)$$

Note that, however, $\Delta t = n\delta t$.

The matrix "D" represented by the equation (31) can be calculated beforehand by determining the function $b_i(s)$ (i=0, 1, 2, 3, $0\leq s \leq 1$), the measurement sampling time interval $\delta t$, and the interval $\Delta t$ of the B-spline function. Accordingly, the matrix "A" represented by the equation (30) can be regarded as a constant matrix which does not depend on measured. movement data.

Provided next is the explanation about the editing process of movement data. The editing process of movement data is made possible, thereby improving its reusability. The editing process is performed not for the movement data itself, but for the entire encoded movement data. Therefore, stored encoded data can be directly edited without being restored into time series movement data.

The data converting device according to this embodiment comprises the following editing capabilities and the like.
(a) coordinate transformation (kinematic transformation)
(b) time conversion
(c) space conversion
(d) division, connection, and fusion
(e) manual adjustment of a weighting coefficient
(f) conversion using dynamics If one example of the data conversion using these editing capabilities is illustrated, it will become the schematic shown in FIG. 10. For example, the encoded movement data in an orthogonal coordinate system is converted into the encoded movement data in a joint coordinate system with a suitable coordinate transformation described in (a). Additionally, the encoded movement data in the joint coordinate system is converted into the encoded movement data representing joint torque with the conversion using dynamics described in (f). These encoded movement data can be further processed with the various editing operations such as (b), (c), (d), (e), etc.

Figure 11:
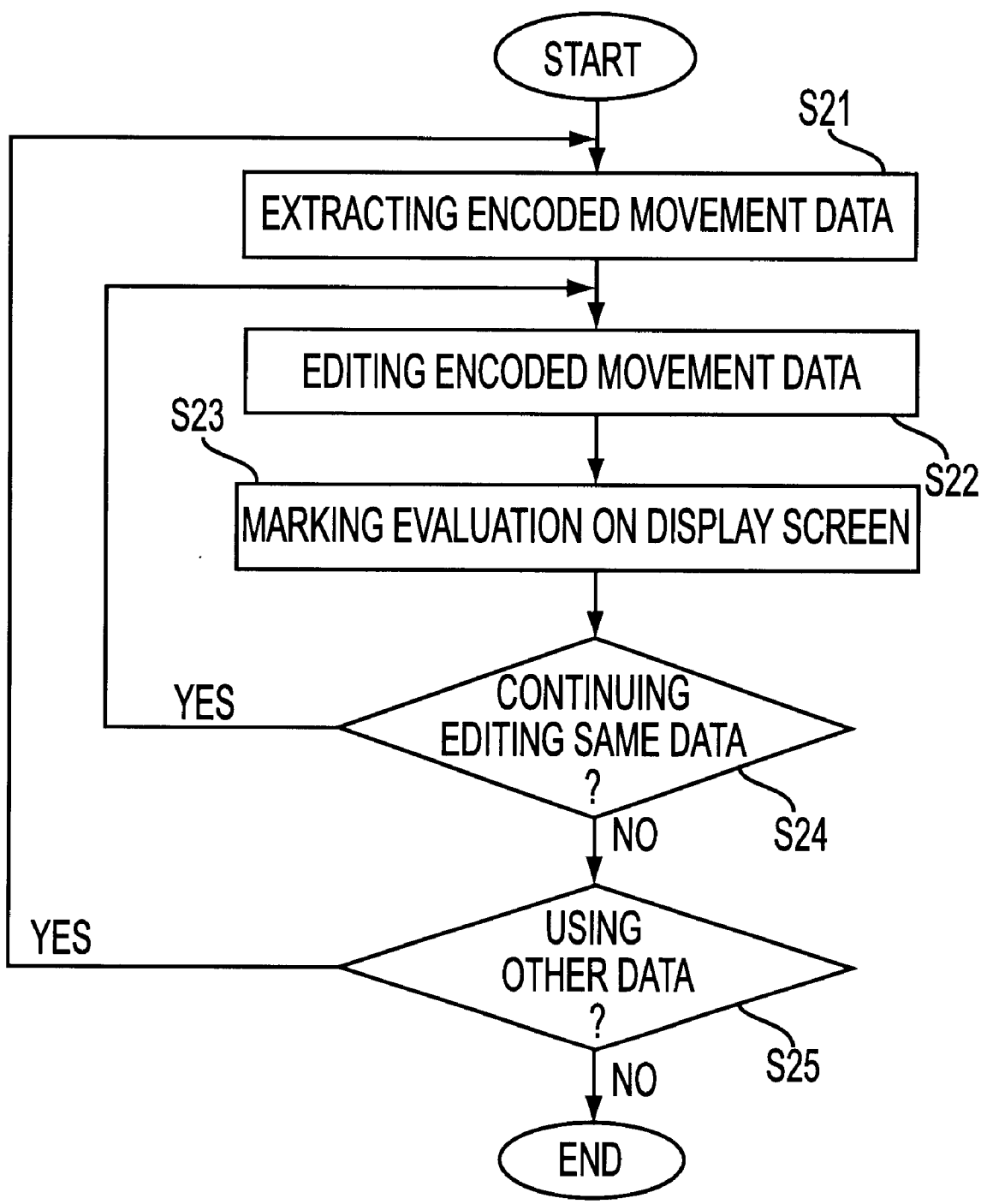
FIG. 11 is a flowchart showing an editing process.

FIG. 11 is a flowchart showing the editing process of encoded movement data. The data converting device first extracts the encoded movement data to be edited from a storage device (step S21), and edits the data according to a user instruction (step S22). Next, the data converting device displays the result of the editing process on a display screen, and waits for user evaluation (step S23).

There are two major methods for displaying the result of the editing process. The first method is a method for restoring movement data from edited encoded movement data, and displaying its time change. The second method is a method for reproducing a movement of a character from restored movement data, and displaying them. The second method has the advantage that it is easier to evaluate the result of the editing process compared with the first method. However, this method requires more processes than those of the first method. A user specifies which display method is to be selected.

Next, the data converting device inquires of the user whether or not to continue the editing process for the same data (step S24). If the user inputs the instruction for continuing the editing process, the data converting device repeats the process in and after step S22. If the user inputs the instruction for terminating the editing process, the data converting device inquires of the user whether or not to perform the editing process using another data (step S25). Here, if the user inputs the instruction for continuing the editing process, the data converting device repeats the process in and after step S21. If the user inputs the instruction for terminating the editing process, the data converting device terminates the process.

Provided next are the explanations about the details of the above described editing capabilities.

(a) Coordinate Transformation (kinematic transformation)

Generally, a certain movement of a body can be expressed by using a plurality of coordinate systems such as an orthogonal coordinate system, a joint coordinate system, etc. Here, the orthogonal coordinate system is a coordinate system for expressing a posture of a body according to the position of a particular bodily portion (such as a head, finger, joint, etc.) in space at a certain time, while the joint coordinate system is a coordinate system for expressing a posture according to the joint angles of a body. With a motion capture system which is frequently used for measuring a movements of a human being by using a video camera and a magnetic sensor, the movement is measured in the orthogonal coordinate system. In the meantime, with a system using a goniometer, a movement is measured with the joint coordinate. It is effective to represent one movement with both of the join coordinate and the orthogonal coordinate in order to move a human body model which is virtually structured in a computer at the time of reproduction of movement data. Because certain movement data is represented with both of the joint and orthogonal coordinates, the coordinate transformation between these two coordinates is required.

Assuming that a certain posture is represented as $x=[x_1, \ldots, x_m]$ with the orthogonal coordinate, and as $q=[q_1, \ldots,$ $q_m$] with the joint coordinate, the following relation is satisfied between these two coordinates.

$$x = h(q) \quad (32)$$

$$q = h^{-1}(x) \quad (33)$$

"h" in the equation (32) is a non-linear vector function, and represents the transformation from the joint coordinate "q" into the orthogonal coordinate "x". Additionally, "$h^{-1}$" included in the equation (33) represents the inverse transformation of "h". At this time, the following equation is satisfied in terms of velocity.

$$\dot{x} = J(q)\dot{q} \quad (34)$$

$$\dot{q} = J^{190}(q)\dot{x} \quad (35)$$

Here, "J" is a Jacobian matrix of the function "h", while "$J^{190}$" widely means an inverse matrix. "$J^{-1}$" is used as "$J^{190}$" if the dimensions of "q" (hereinafter referred to as a "q dot") is equal to those of "$\dot{x}$" (hereinafter referred to as an "x dot"). If the dimensions of the q dot is higher than those of the x dot, for example, a pseudo inverse matrix "$J^T(JJ^T)^{-1}$", etc. is used. As the inverse matrix in the latter case, some matrices which are partially modified depending on a situation or a use purpose have been proposed up to now, and can be used.

Here, assume that the encoded movement data representing a certain movement is represented as $X=[x_{-k}, \ldots, x_{N-1}]$ with the orthogonal coordinate, and as $Q=[q_{-k}, \ldots, q_{-1}]$ with the joint coordinate. At this time, the following relation is satisfied between the encoded movement data represented with the two coordinates based on equations (24), (34), and (35).

$$\begin{cases} x_i = J(q(i\Delta t))q_i \\ q_i = J^\#(q(i\Delta t))x_i \end{cases}, (i = -k, \ldots, N-1) \quad (36)$$

Here, note that "x" and "q" included in the equations (32) and (34) represent the movement data before being encoded, while "$x_i$" and "$q_i$" included in the equation (36) represent the encoded movement data. Additionally, "$J(q(i\Delta t))$" and "$J^{190}(q(i\Delta t))$" which are included in the equation (36) are matrices obtained by respectively substituting "$t=i\Delta t$" for "J(q)" in the equation (34) and for "$J^\#$" in the equation (35).

(b) Time Conversion

The time conversion has the capability for delaying the start time of a movement, and extending or shortening a period of movement time. Described here are the two types of operations such as the delay operation of a movement start time and the extending /shortening operation of a period of movement time. All the operations in terms of time can be performed with both of the orthogonal and joint coordinates.

Assume that the result of encoding certain movement data "y(t)" ($0 \leq t \leq T$) is $W=[w_{-k}, w_{-k+1}, \ldots, W_{N-1}]$, and $T=N\Delta t$. At this time, the delay operation Delay (W, j) (j=−k, . . . , N−1), which delays the start time of the movement by "j$\Delta t$", serves as follows if the operation result is assumed to be "V".

$$V = \text{Delay}(W, j) \quad (37)$$

$$= [\underbrace{w_{-k}, \ldots, w_{-k}}_{j+1}, w_{-k+1}, \ldots, w_{N-1}]$$

$$= [v_{-k}, \ldots, v_{N+j-1}]$$

That is, this operation is the conversion for adding "j" $w_{-k}$"s to the head of the encoded movement data "W", and making the movement stationary at its initial value for "j$\Delta t$".

Figure 12:
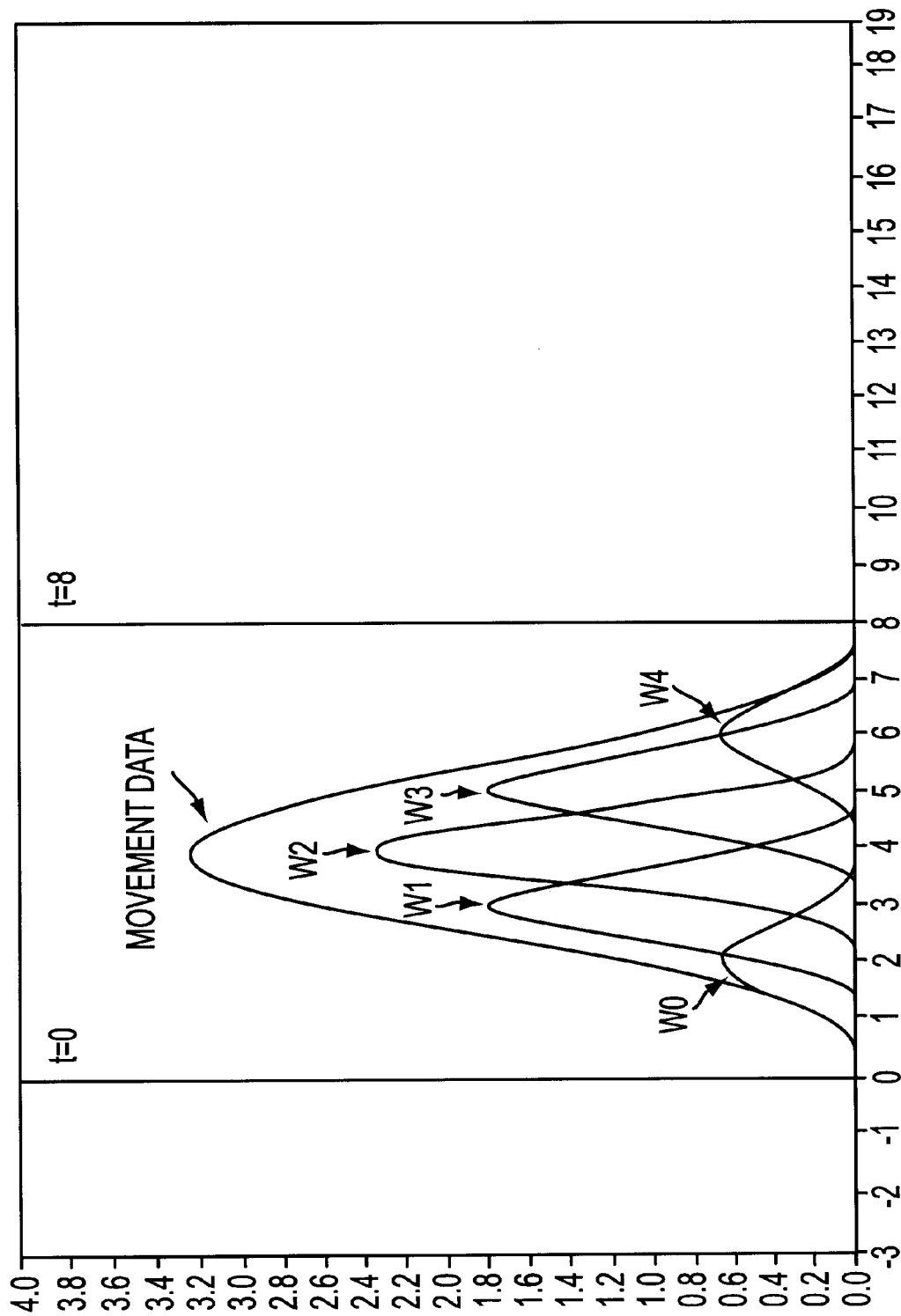
FIG. 12 shows second movement data.

FIG. 12 exemplifies the movement data before being converted (such as positional data) in a period $0 \leq t \leq 8$[sec]. If this movement data is encoded with B-spline functions of degree three $B^{(3)}_i(t)$ (i=−3, . . . , 7) based on the assumption that $\Delta t=1.0$ and N=8, the following encoded movement data can be obtained.

$$W = [w_{-3}, w_{-2}, w_{-1}, w_0, w_1, w_2, w_3, w_4, w_5, w_6, w_7] \quad (38)$$

$$= [0, 0, 0, 1, 2.7, 3.5, 2.7, 1, 0, 0, 0]$$

In the period $0 \leq t \leq 8$ shown in FIG. 12, the shapes of B-spline functions "$w_0 B^{(3)}_0(t)$", "$w_1 B^{(3)}_1(t)$", "$w_2 B^{(3)}_2(t)$", "$w_3 B^{(3)}_3(t)$", and "$w_4 B^{(3)}_4(t)$", which are weighted by the coefficients $w_0, w_1, w_2, w_3$, and $w_4$, are illustrated.

If the delay operation (W, 6) for delaying the start time by six seconds is performed for the encoded movement data represented by the equation (38), the encoded movement data after being converted becomes:

$$V = [v_{-3}, v_{-2}, v_{-1}, v_0, v_1, v_2, v_3, v_4, v_5, v_6, v_7, v_8, \quad (39)$$

$$v_9, v_{10}, v_{11}, v_{12}, v_{13}]$$

$$= [0, 0, 0, 0, 0, 0, 0, 0, 0, 1, 2.7, 3.5, 2.7, 1, 0, 0, 0]$$

Figure 13:
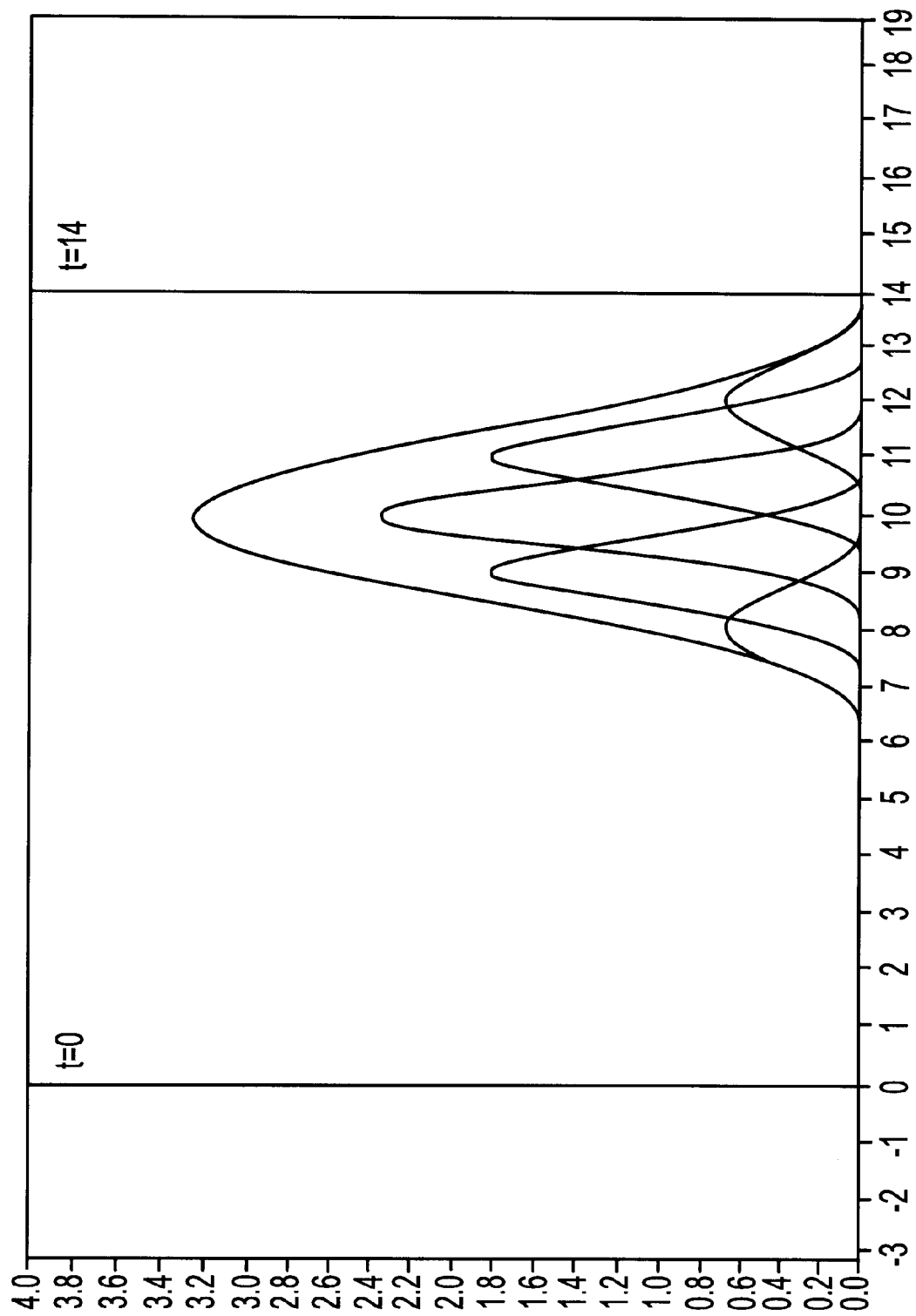
FIG. 13 shows delayed movement data.

If the B-spline functions weighted by the encoded movement data represented by the equation (39) and the movement data obtained as their total are illustrated, they will become the data shown in FIG. 13. As is known from this figure, the period of the movement data of FIG. 12 is extended to $0 \leq t \leq 14$ and there is no positional change in the initial six seconds.

The extending/shortening operation of a period of movement time "TemporalScale (W, λ)" represents the conversion for extending or shortening a period of movement time "T" to a λ multiple. Note that, however, "λ" is a real number. Assuming that the result is "V", this operation serves as follows.

$$V = \text{TemporalScale}(W, \lambda) \quad (40)$$

$$= [v_{-k}, \ldots, v_{\hat{N}-1}]$$

Note that, however, "$\hat{N}$" (hereinafter referred to as an "N hat") must satisfy the following condition.

$$\lambda T = \hat{N} \Delta t \quad (41)$$

The coefficient $v_i$ (i=−k, . . . , N hat−1) of the B-spline function must satisfy the following function.

$$\sum_{i=-k}^{\hat{N}-1} v_i B_i^{(k)}(t) = \sum_{i=-k}^{N-1} w_i B_i^{(k)}(t/\lambda), (t = j - \delta t, j = 0, \ldots, \lambda M) \quad (42)$$

To obtain $v_i$ (i=−k, . . . , N hat−1) which satisfies the equation (42), the encoding process shown in FIG. 9 based on the equation (19) may be performed by regarding the right side of the equation (42) as the function "y(t)".

For example, if the operation for doubly extending the period of movement time TemporalScale (W, 2) is performed for the encoded movement data represented by the equation (38), the encoded movement data after being converted will become the following according to the equation (42).

$$V = [v_{-3}, v_{-2}, v_{-1}, v_0, v_1, v_2, v_3, v_4, v_5, v_6, v_7, v_8, v_9, \quad (43)$$
$$v_{10}, v_{11}, v_{12}, v_{13}, v_{14}, v_{15}]$$
$$= [0, 0, 0, 0.13, 0.5, 1.09, 1.85, 2.59, 3.1, 3.3, 3.1, 2.59,$$
$$1.85, 1.09, 0.5, 0.13, 0, 0, 0]$$

Figure 14:
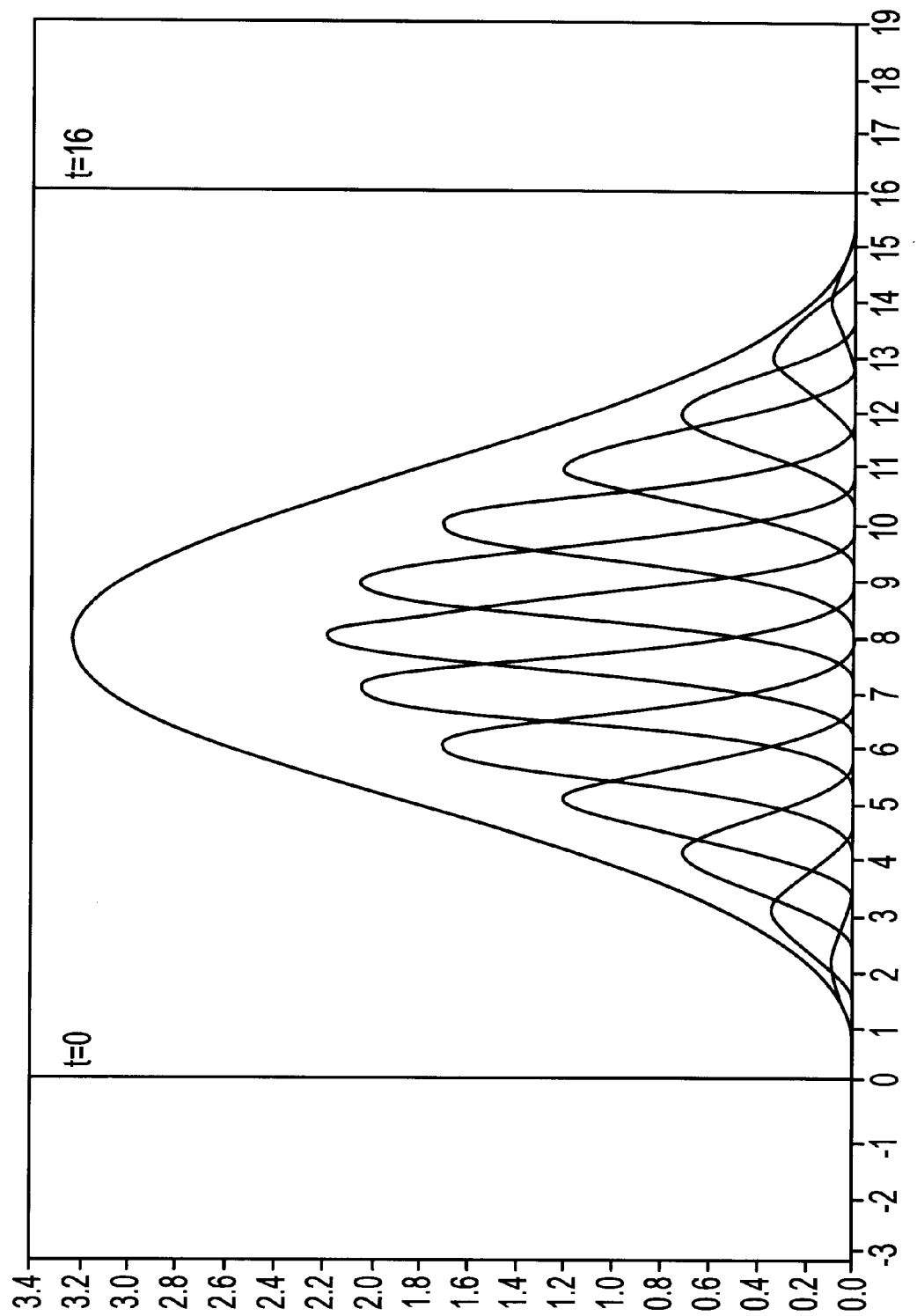
FIG. 14 shows extended movement data.

If the B-spline functions weighed by the encoded movement data represented by the equation (43) and the movement data obtained as their total are illustrated, they will become the data shown in FIG. 14. As is known from this figure, the period of movement time of FIG. 12 is extended to 16 seconds.

(c) Space Conversion

A translation , rotation, expansion, and a reduction (note that, however, the period of movement time "T" is constant) are explained as the conversions in terms of space. These conversions are performed for the encoded movement data mainly in the orthogonal coordinate system. Here, assume that $w_i \in R^m$ for the encoded movement data $W=[w_{-k}, \ldots, w_{N-1}]$.

At this time, the encoded movement data "W" is converted into the following encoded movement data "V" with the operation Translate (W, δw) for translating the movement data by $\delta w \in R^m$.

$$V = \text{Translate}(W, \delta w) \quad (44)$$
$$= [w_{-k} + \delta w, \ldots, w_{N-1} + \delta w]$$
$$= [v_{-k}, \ldots, v_{N-1}]$$

Assume that the operation Translate (W, 1) for translating the movement data by 1.0 is performed for the encoded movement data represented by the equation (38), the encoded movement data after being converted will become the following equation based on the equation (44).

$$V = [v_{-3}, v_{-2}, v_{-1}, v_0, v_1, v_2, v_3, v_4, v_5, v_6, v_7] \quad (45)$$
$$= [1, 1, 1, 2, 3.7, 4.5, 3.7, 2, 1, 1, 1]$$

Figure 15:
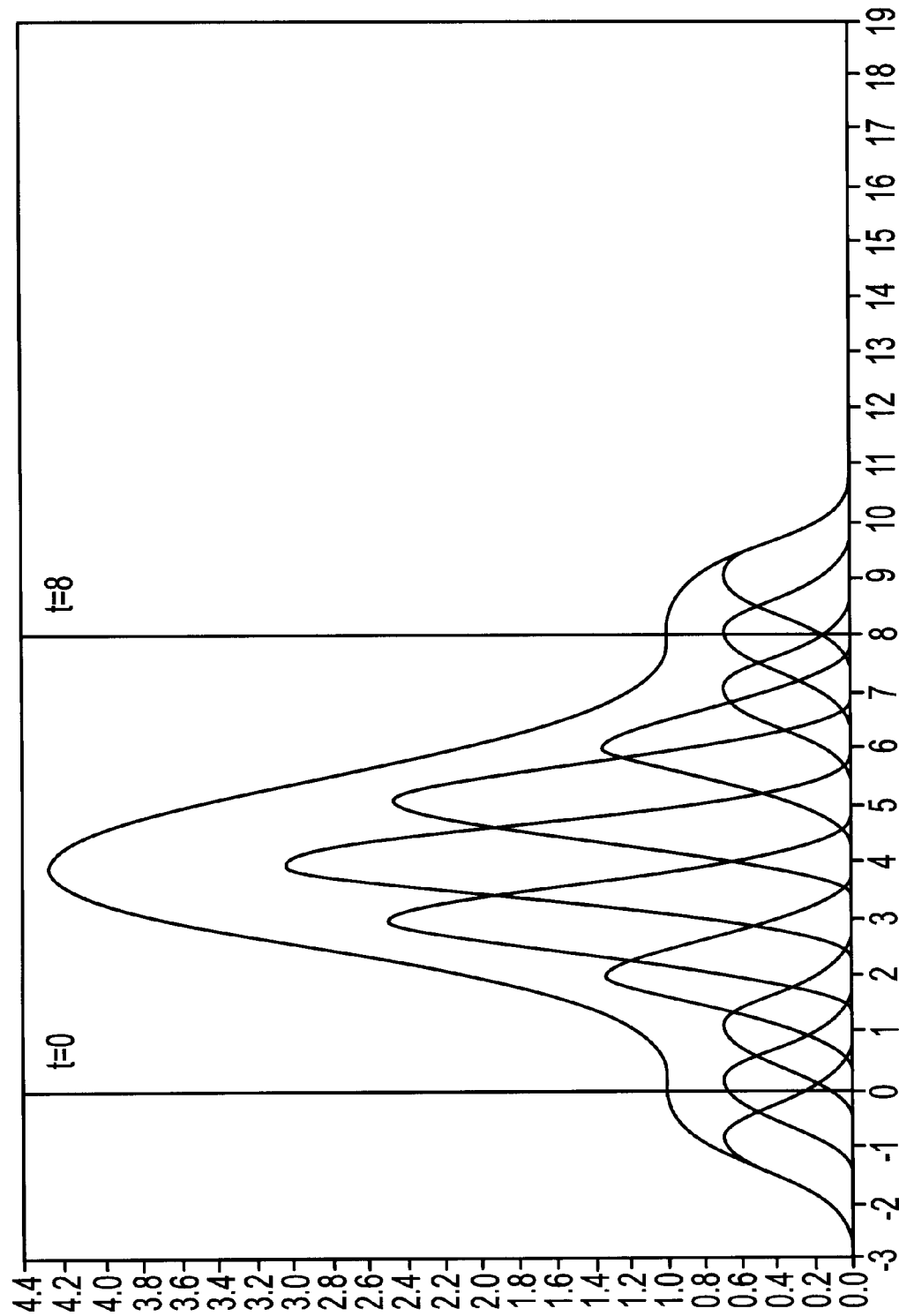
FIG. 15 shows movement data after being translated.

If the B-spline functions weighted by the encoded movement data represented by the equation (45) and the movement data obtained as their total are illustrated, they will become the data shown in FIG. 15. As is known from this figure, the movement data of FIG. 12 is translated upward by 1.0.

With the operation Rotation (W, q) for rotating the movement data about the origin of the orthogonal coordinate by an angle "q", the encoded movement data "W" is converted into the following encoded movement data "V".

$$V = \text{Rotation}(W, q) \quad (46)$$
$$= [R(q)w_{-k}, \ldots, R(q)w_{N-1}]$$
$$= [v_{-k}, \ldots, v_{N-1}]$$

where "R(q)" is a rotation matrix for rotating the coefficient vector "$w_i$" about the origin by the angle "q". For example, if the orthogonal coordinate is two-dimensional, the following matrix "R(q)" is used.

$$R(q) = \begin{bmatrix} \cos(q) & \sin(q) \\ -\sin(q) & \cos(q) \end{bmatrix} \quad (47)$$

Additionally, with the operation SpatialScale (W, λ) for multiplying only the size of movement data by λ without changing the period of movement time, the encoded movement data "W" is converted into the following encoded movement data "V".

$$V = \text{SpatialScale}(W, \lambda) \quad (48)$$
$$= [\lambda w_{-k}, \ldots, \lambda w_{N-1}]$$
$$= [v_{-k}, \ldots, v_{N-1}]$$

For example, if the operation SpatialScale (W, 2) for doubling the size of movement data is performed for the encoded movement data represented by the equation (38), the encoded movement data after being converted will become the following according to the equation (48).

$$V = [v_{-3}, v_{-2}, v_{-1}, v_0, v_1, v_2, v_3, v_4, v_5, v_6, v_7] \quad (49)$$
$$= [0, 0, 0, 2, 5.4, 7, 5.4, 2, 0, 0, 0]$$

Figure 16:
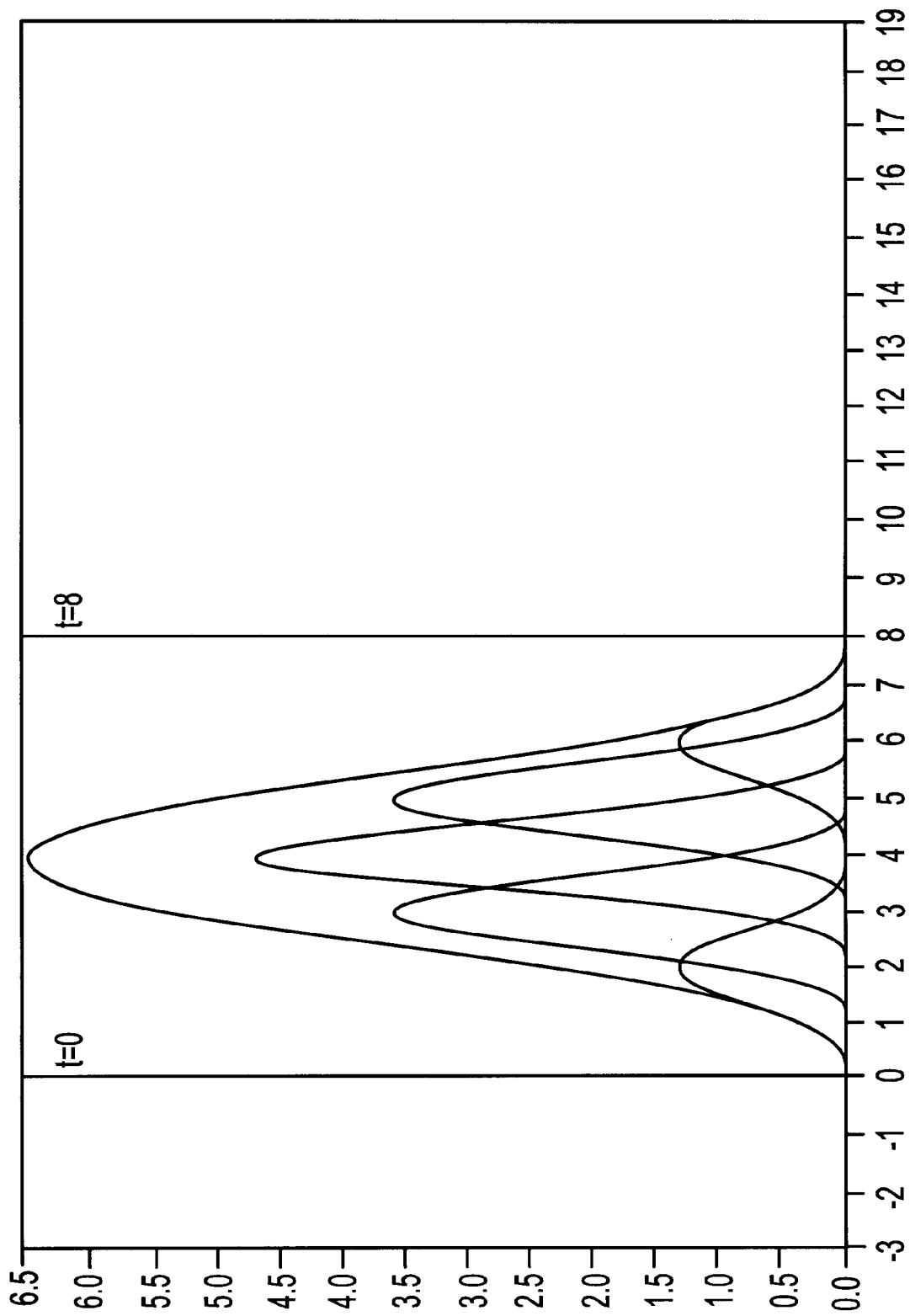
FIG. 16 shows expanded movement data.

If the B-spline functions weighted by the encoded movement data represented by the equation (49) and the movement data obtained as their total are illustrated, they will become the data shown in FIG. 16. As is known from this figure, the entire size of the movement data of FIG. 12 becomes double.

(d) Division, Connection, and Fusion

Provided next is the explanation about the editing capabilities for dividing one piece of encoded movement data into two, and generating new encoded movement data from a plurality of pieces of encoded movement data. Here, two types of the division operation of the encoded movement data, the connection operation of a plurality of encoded movement data, and the fusion operation are referred to.

With the operation Cut 1 (W, j) for dividing the encoded movement data $W=[w_{-k}, \ldots, w_{N-1}]$ into two pieces between the coefficient vector $w_j$ in the "j"th column and the coefficient vector $w_{j+1}$ in the "j+1"th column, the encoded movement data "W" is converted as follows.

$$Cut1(W, j) = \begin{cases} W^{(1)} = [w_{-k}^{(1)}, \ldots, w_j^{(1)}] = [w_{-k}, \ldots, w_j] \\ W^{(2)} = [w_{-k}^{(2)}, \ldots, w_{-k+N-j-2}^{(2)}] = [w_{j+1}, \ldots, w_{N-1}] \end{cases} \quad (50)$$

where "$w_j$" corresponds to the weighting coefficient of the "j"th B-spline function $B^{(k)}_j(t)$. Let's consider the data shown in FIG. 17 as the example of the movement data for which the division operation is performed.

Figure 17:
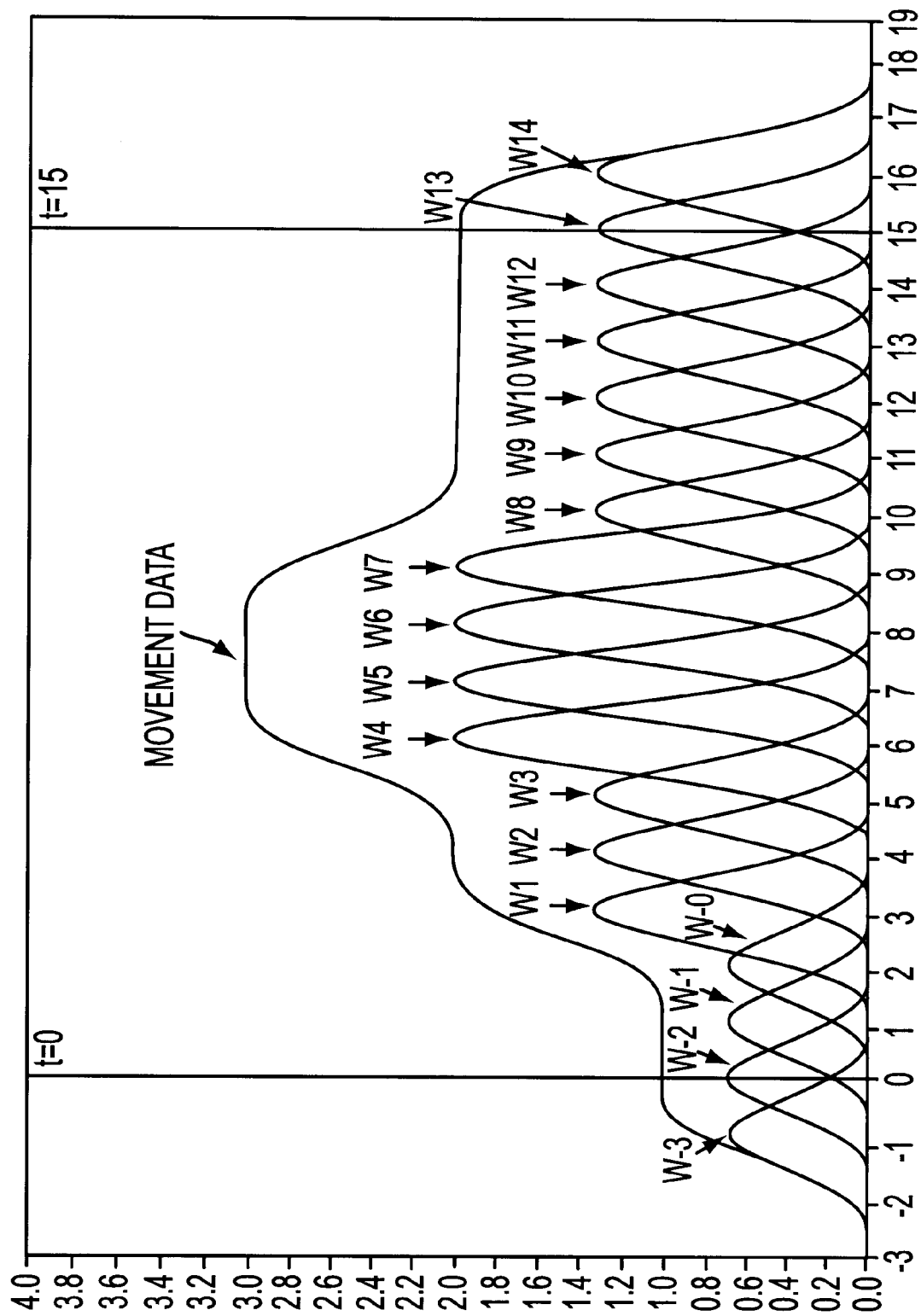
FIG. 17 shows third movement data.

The movement data shown in FIG. 17 is measured in a period $0 \leq t \leq 15[\sec]$. If this movement data is encoded using the B-spline functions of degree three $B^{(3)}_i(t)$ ($i=-3, \ldots, 14$) based on the assumption that $\Delta t=1.0$ and $N=15$, the following encoded movement data can be obtained.

$$W = [w_{-3}, w_{-2}, w_{-1}, w_0, w_1, w_2, w_3, w_4, w_5, w_6, w_7, \quad (51)$$
$$w_8, w_9, w_{10}, w_{11}, w_{12}, w_{13}, w_{14}]$$
$$= [1, 1, 1, 1, 2, 2, 2, 3, 3, 3, 3, 2, 2, 2, 2, 2, 2, 2]$$

In the period $0 \leq t \leq 15$ shown in FIG. 17, the shapes of the B-spline functions $W_{-3}B^{(3)}_{-3}(t)$, $w_{-2}B^{(3)}_{-2}(t)$, $w_{-1}B^{(3)}_{-1}(t)$, $w_0 B^{(3)}_0(t)$, $w_1 B_{(3)1}(t)$, $w_2 B^{(3)}_2(t)$, $w_3 B^{(3)}_{3(t)}$, $w_4 B^{(3)}_4(t)$, $w_5 B^{(3)}_5(t)$, $w_6 B^{(3)}_6(t)$, $w_7 B^{(3)}_7(t)$, $w_8 B^{(3)}_8(t)$, $w_9 B^{(3)}_9(t)$, $w_{10}B^{(3)}_{10}(t)$, $w_{11}B^{(3)}_{11}(t)$, $w_{12}B^{(3)}_{12}(t)$, $w_{13}B^{(3)}_{13}(t)$, and $w_{14}B^{(3)}_{14}(t)$, which are weighted by the coefficients, $w_{-3}$, $w_{-2}$, $w_{-1}$, $w_0$, $w_1$, $w_2$, $w_3$, $w_4$, $w_5$, $w_6$, $w_7$, $w_8$, $w_9$, $w_{10}$, $w_{11}$, $w_{12}$, $w_{13}$, and $w_{14}$, are illustrated.

If the operation Cut 1 (W, 4) for dividing data between $w_4$ and $w_5$ is performed for the encoded movement data represented by the equation (51), the encoded movement data after being converted will become the followings according to the equation (50).

$$W^{(1)} = [w^{(1)}_{-3}, w^{(1)}_{-2}, w^{(1)}_{-1}, w^{(1)}_0, w^{(1)}_1, w^{(1)}_2, w^{(1)}_3, w^{(1)}_4] \quad (52)$$
$$= [1, 1, 1, 1, 2, 2, 2, 3]$$
$$W^{(2)} = [w^{(2)}_{-3}, w^{(2)}_{-2}, w^{(2)}_{-1}, w^{(2)}_0, w^{(2)}_1, w^{(2)}_2, w^{(2)}_3, w^{(2)}_4,$$
$$w^{(2)}_5, w^{(2)}_6]$$
$$= [3, 3, 3, 2, 2, 2, 2, 2, 2, 2]$$

Figure 18:
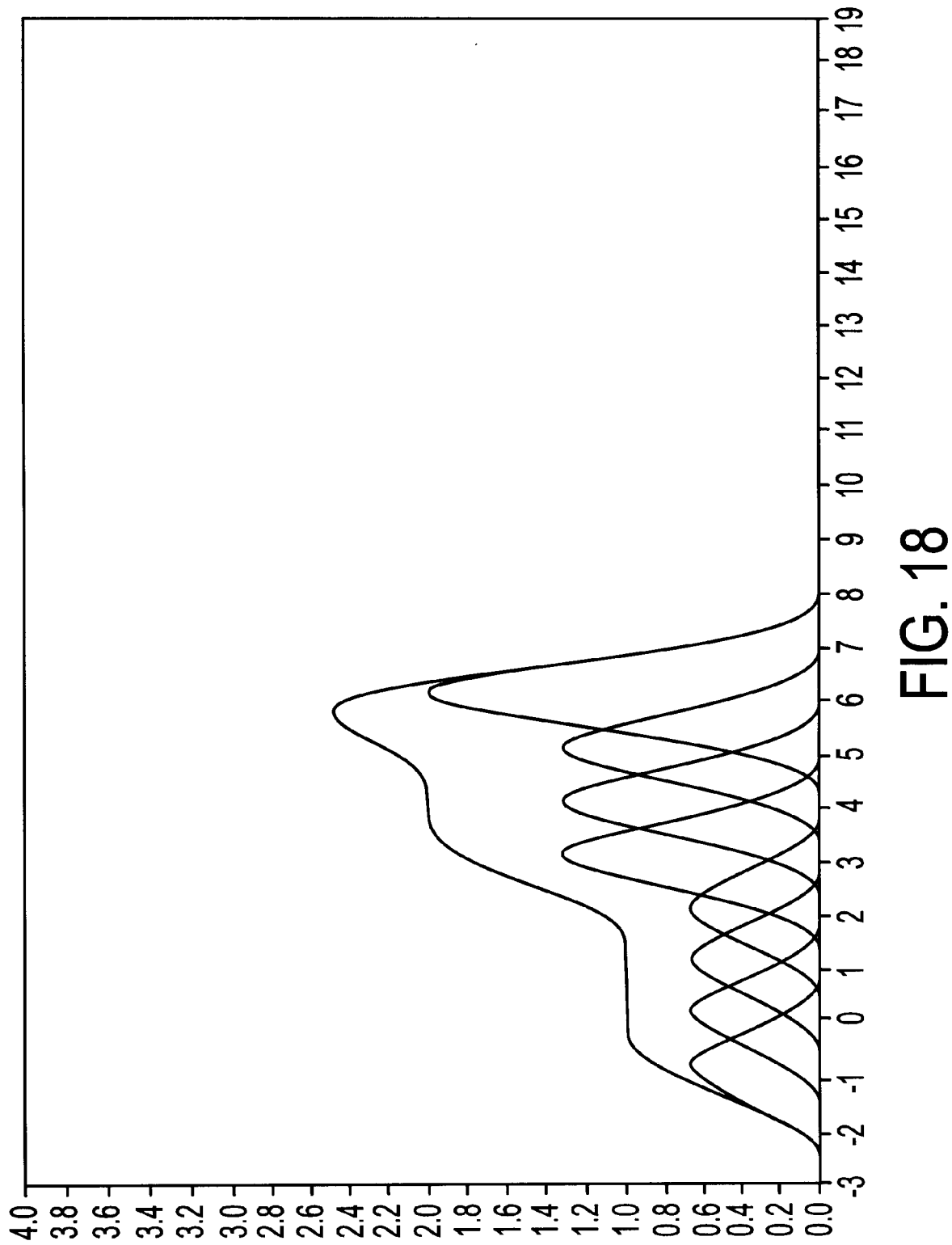
FIG. 18 shows first divided movement data.
Figure 19:
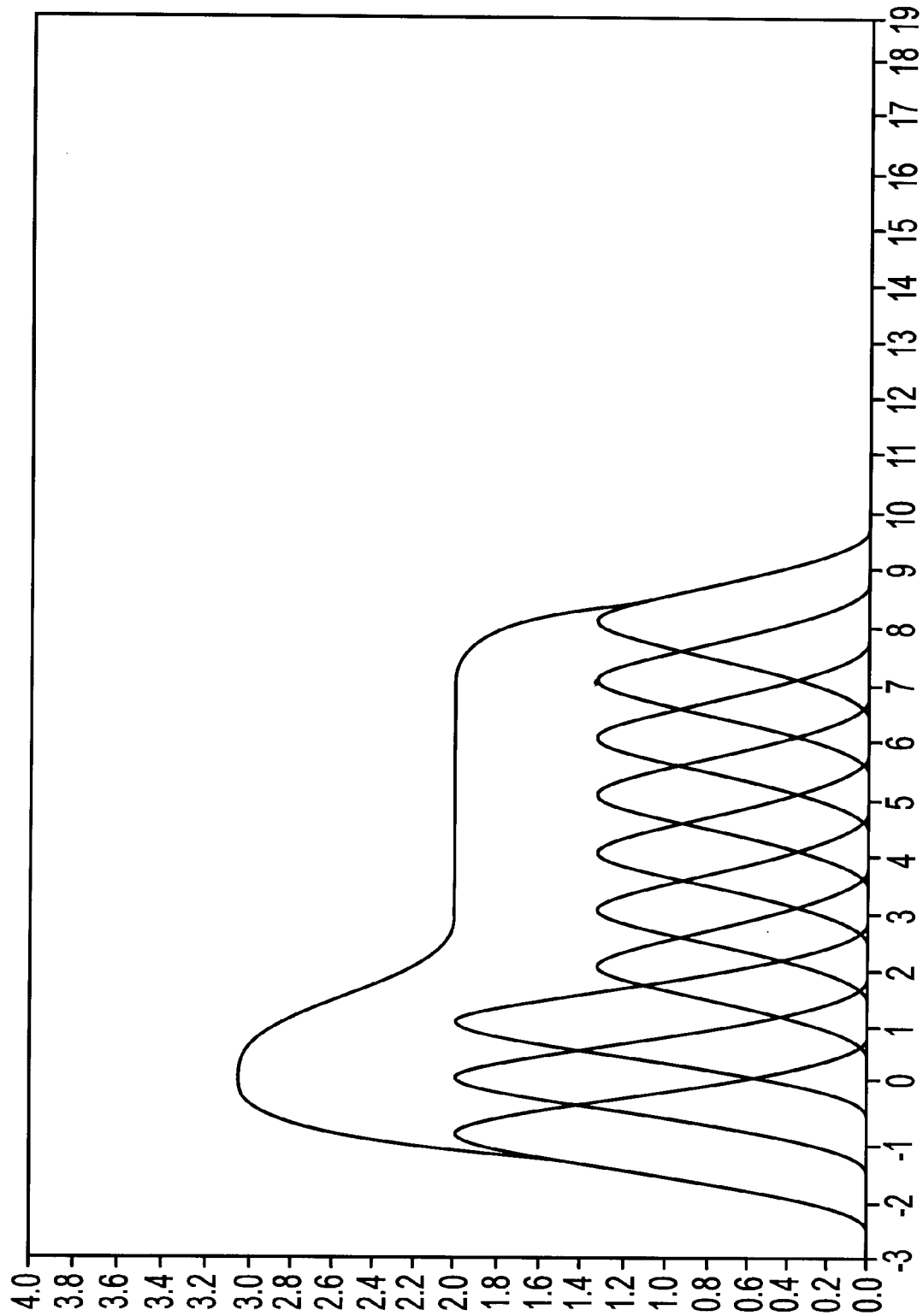
FIG. 19 shows second divided movement data.

If the B-spline functions weighted by the encoded movement data $W^{(1)}$ represented by the equation (52) and the movement data obtained as their total are illustrated, they will become the data shown in FIG. 18. Additionally, if the B-spline functions weighted by the encoded movement data $W^{(2)}$ and the movement data obtained as their total are illustrated, they will become the data shown in FIG. 19. The movement data shown in FIGS. 18 and 19 represent the result of dividing the movement data shown in FIG. 17 into two pieces.

Furthermore, with the operation Cut 2 (W, j) for dividing the encoded movement data "W" into two pieces of encoded movement data at the time $t=j\Delta t$, the encoded movement data "W" is converted as follows.

$$Cut2(W, j) = \begin{cases} W^{(1)} = [w^{(1)}_{-k}, \ldots, w^{(1)}_{j-1}] = [w_{-k}, \ldots, w_{j-1}] \\ W^{(2)} = [w^{(2)}_{-k}, \ldots, w^{(2)}_{N-j-1}] = [w_{j-k}, \ldots, w_{N-1}] \end{cases} \quad (53)$$

For example, if the operation Cut 2 (W, 7) for dividing data at a time $t=7\Delta t=7$ is performed for the encoded movement data represented by the equation (51), the encoded movement data after being converted will become the followings according to the equation (53).

$$W^{(1)} = [w^{(1)}_{-3}, w^{(1)}_{-2}, w^{(1)}_{-1}, w^{(1)}_0, w^{(1)}_1, w^{(1)}_2, w^{(1)}_3, w^{(1)}_4 \quad (54)$$
$$w^{(1)}_5, w^{(1)}_6]$$
$$= [1, 1, 1, 1, 2, 2, 2, 3, 3, 3]$$
$$W^{(2)} = [w^{(2)}_{-3}, w^{(2)}_{-2}, w^{(2)}_{-1}, w^{(2)}_0, w^{(2)}_1, w^{(2)}_2, w^{(2)}_3, w^{(2)}_4,$$
$$w^{(2)}_5, w^{(2)}_6, w^{(2)}_7]$$
$$= [3, 3, 3, 3, 2, 2, 2, 2, 2, 2, 2]$$

Figure 20:
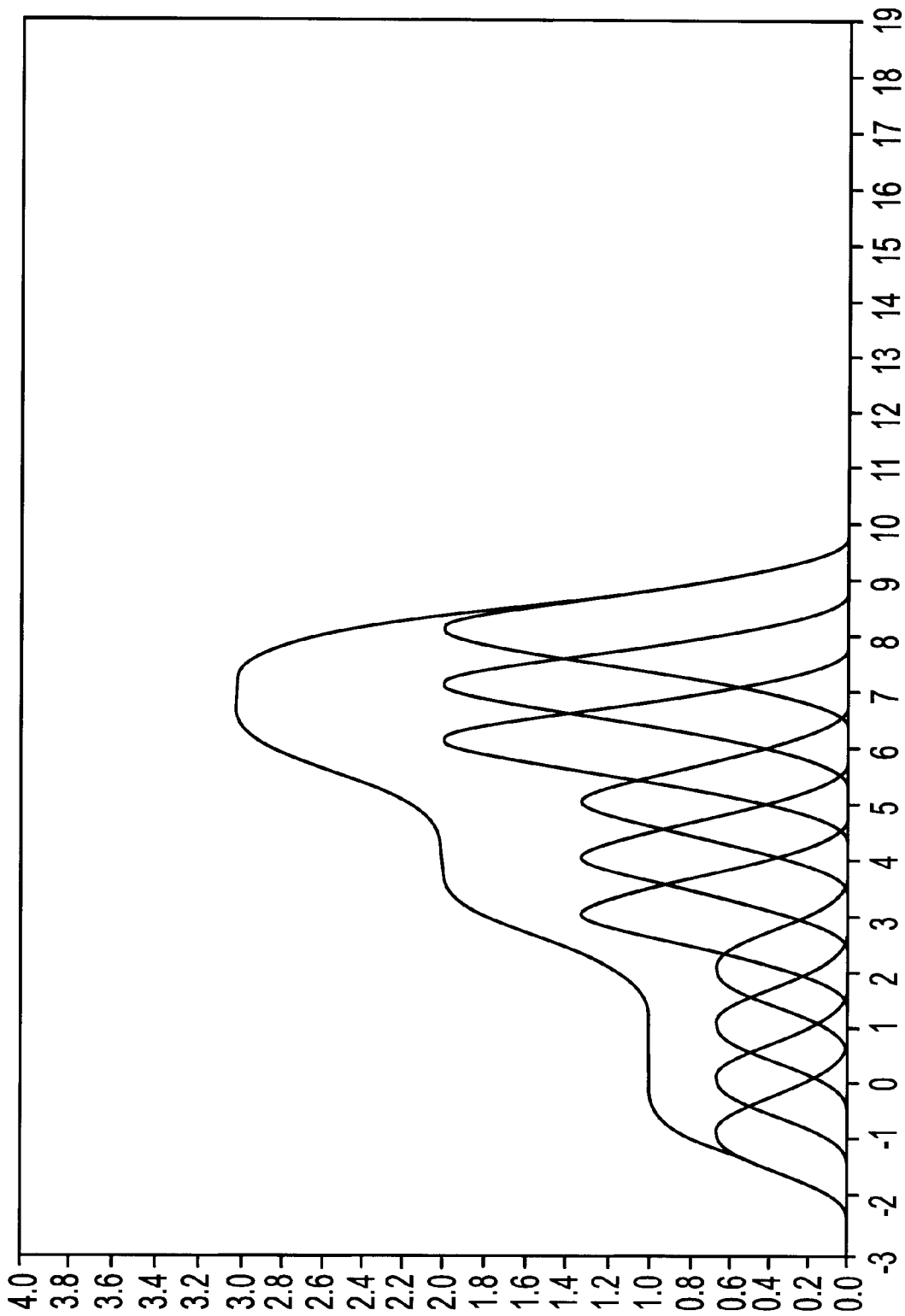
FIG. 20 shows third divided movement data.

If the B-spline functions weighted by the encoded movement data $W^{(1)}$ represented by the equation (54) and the movement data obtained as their total are illustrated, they will become the data shown in FIG. 20. Additionally, if the B-spline functions weighted by the encoded movement data $W^{(2)}$ and the movement data obtained as their total are illustrated, they will become the data shown in FIG. 21.

Figure 21:
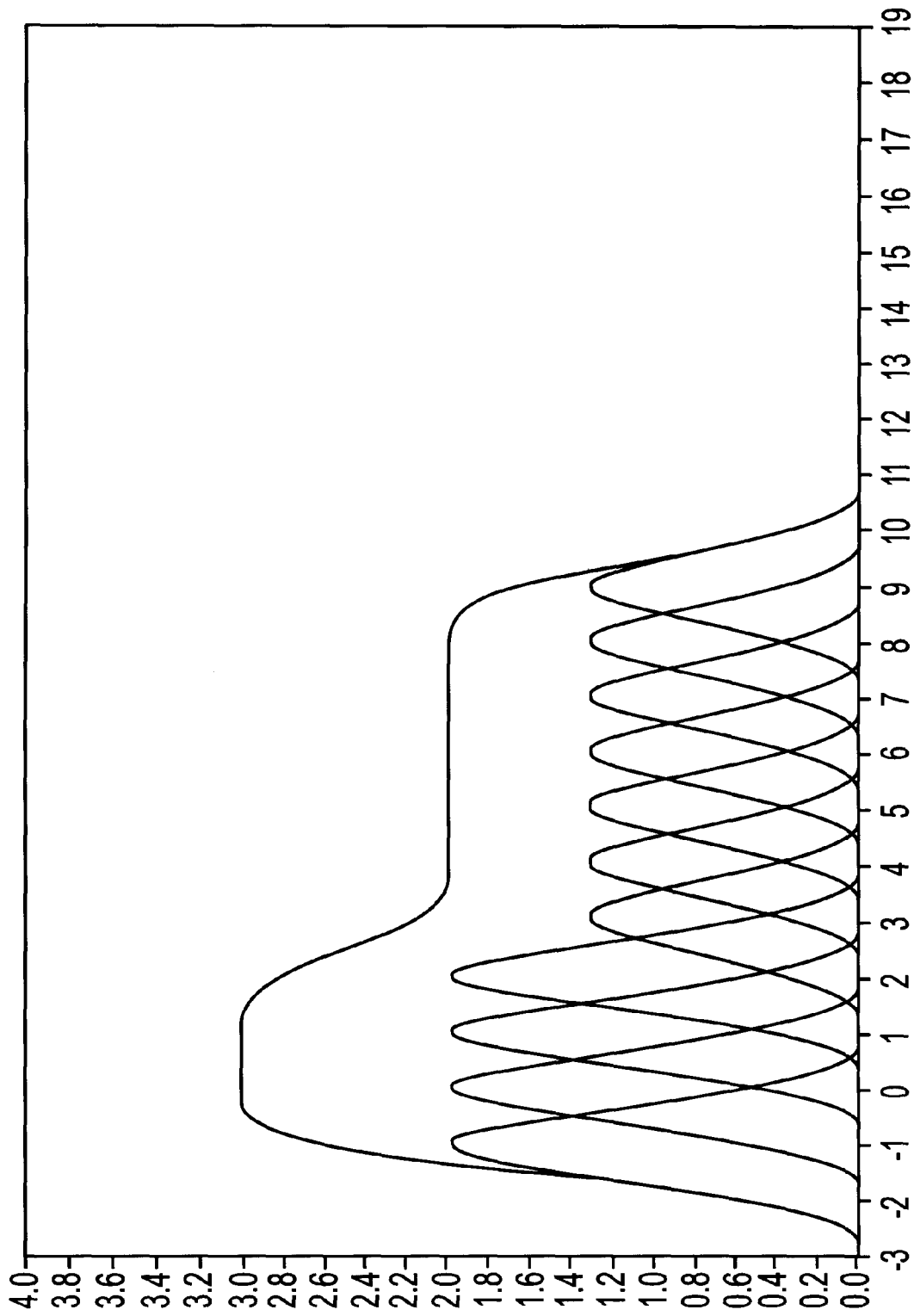
FIG. 21 shows fourth divided movement data.

The movement data shown in FIGS. 20 and 21 represent the results of dividing the movement data shown in FIG. 17 into two pieces.

If the movement data of FIG. 18, which is obtained by the operation Cut 1, is compared with the movement data of FIG. 20, which is obtained by the operation Cut 2, the former data is not proved to include the value of the time $t=7$ of the movement data shown in FIG. 17, while the latter data is proved to include this value. As described above, the operation Cut 2 can divide the encoded movement data while maintaining the shape close to the division point of the original movement data. This is because the coefficient vectors before and after the division time are left in both of the encoded movement data $W^{(1)}$ and $W^{(2)}$ after being divided.

Additionally, with the operation Connect ($W^{(1)}$, $W^{(2)}$) for generating one piece of encoded movement data by connecting the following two pieces of encoded movement data represented by (55), the following new encoded movement data "V" represented by the equation (56) is generated.

$$W^{(1)} = [w^{(1)}_{-k}, \ldots, w^{(1)}_{N_1-1}], W^{(2)} = [w^{(2)}_{-k}, \ldots, w^{(2)}_{N_2-1}] \quad (55)$$

$$V = \text{Connect}(W^{(1)}, W^{(2)}) = [w^{(1)}_{-k}, \ldots, w^{(1)}_{N_1-1}, w^{(2)}_{-k}, \ldots, w^{(2)}_{N_2-1}] \quad (56)$$
$$= [v_{-k}, \ldots, v_{N_1+N_2+k-1}]$$

For example, if the operation Connect ($W^{(1)}$, $W^{(2)}$) are performed for the encoded movement data $W^{(1)}$ and $W^{(2)}$ represented by the equation (52), the encoded movement data "W" represented by the equation (51) is generated according to the equation (56).

With the operation Fusion ($W^{(1)}$, $W^{(2)}$) for generating one piece of encoded movement data by fusing (overlapping or superposing) the two pieces of encoded movement data represented by the equation (55), the following new encoded movement data "V" is generated.

$$V = \text{Fusion}(W^{(1)}, W^{(2)}) = [w^{(1)}_{-k} + w^{(2)}_{-k}, \ldots, w^{(1)}_{N-1} + w^{(2)}_{N-1}] \quad (57)$$
$$= [v_{-k}, \ldots, v_{N-1}]$$

Note that, however, $N=\max(N_1, N_2)$ in the equation (57). If $N_1$ is different from $N_2$, "0" vector is added as the coefficient vector of the lack of the data whose period of movement time is shorter, and the calculation is performed using the added "0" vector. Assuming that $N_1=N_2+j$, the equation (57) will become:

$$V = \text{Fusion}(W^{(1)}, W^{(2)}) \quad (58)$$
$$= \left[ w^{(1)}_{-k} + w^{(2)}_{-k}, \ldots, w^{(1)}_{N_2-1} + w^{(2)}_{N_2-1}, \underbrace{w^{(1)}_{N_2}, \ldots, w^{(1)}_{N_1-1}}_{j} \right]$$

For example, if the operation Fusion ($W^{(1)}$, $W^{(2)}$) is performed for the encoded movement data $W^{(1)}$ and $W^{(2)}$ represented by the equation (52), the following encoded movement data is generated according to the equation (57).

$$V = [v_{-3}, v_{-2}, v_{-1}, v_0, v_1, v_2, v_3, v_4, v_5, v_6] \quad (59)$$
$$= [4, 4, 4, 3, 4, 4, 4, 5, 2, 2]$$

Figure 22:
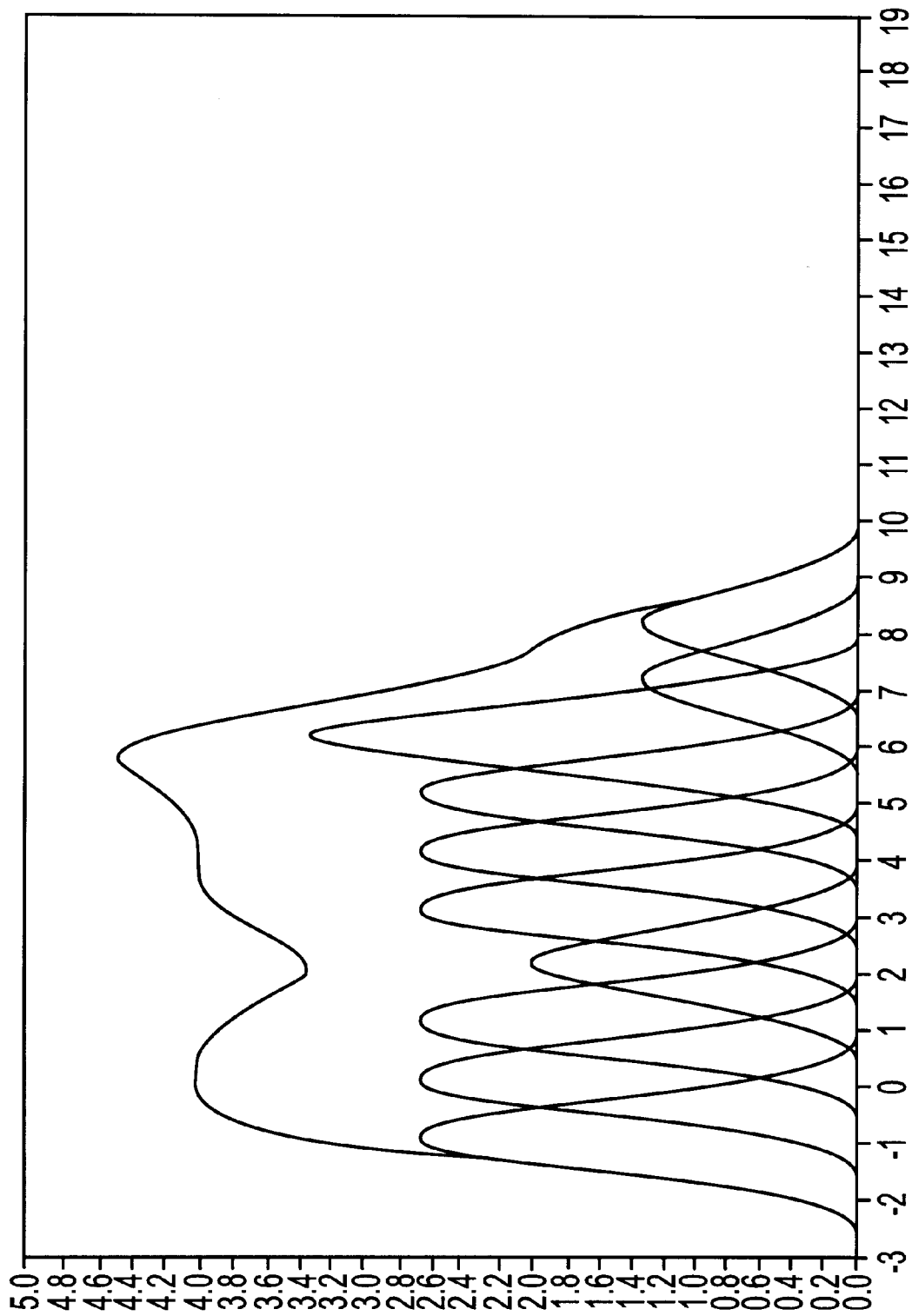
FIG. 22 shows fused movement data.

If the B-spline functions weighted by the encoded movement data represented by the equation (59) and the movement data obtained as their total are illustrated, they will become the data shown in FIG. 22. The movement data shown in FIG. 22 represents the result obtained by fusing the movement data shown in FIGS. 18 and 19.

(e) Manual Adjustment of a Weighting Coefficient The operation Modify (W, j, δw) is an operation for adding the vector δw to one coefficient vector $w_j$ (j=−k, ..., N−1) of the encoded movement data W=[$w_{-k}$, ..., $w_{N-1}$] in order to partly adjust or modify the trajectory of a movement. With this operation, the encoded movement data "W" is converted as follows.

$$\text{Modify}(W, j, \delta w) = [w_{-k}, \ldots, \underbrace{w_j + \delta w}_{j\text{-th element}}, \ldots, w_{N-1}] \quad (60)$$

Normally, the encoded movement data is an array of coefficient vectors of the B-spline functions which are smooth and local basis functions. Therefore, even if the value of one coefficient vector is changed, its influence is limited locally. Additionally, the trajectory of the entire movement remains smooth at any time.

(f) Conversion Using Dynamics

The conversion using inverse dynamics converts the encoded movement data representing the movements such as a position, velocity, acceleration, etc. into the encoded movement data representing joint torque. Conversely, the conversion using forward dynamics converts the encoded movement data representing joint torque into the encoded movement data representing a movement.

Meanwhile, there is a theory that the trajectory of a movement of an arm of a human being is intended so that the change of joint torque performing the movement is to be the minimum (Y.Uno, M.Kawato, and R.Suzuki: Formation and Control of Optimal Trajectory in Human Multijoint Arm Movement. Minimum Torque-Change Model. Biol. Cybern. Vol,61, pp.89–101, 1989)

This theory insists that the time waveform of joint torque causing the arm movement is smooth. Accordingly, the encoded movement data representing the movement is converted into the encoded movement data representing the joint torque, and the above described smooth editing processes are performed for the encoded movement data representing the joint torque, so that the editing processes can be made possible while the naturalness of the movement is maintained. Here, the smooth editing processes mean that the movement data after being edited is smooth.

Assume that the encoded movement data representing the movement is W=[$w_{-k}$, ..., $w_{N-1}$], and the encoded movement data representing the joint torque is U=[$U_{-k}$, ..., $U_{N-1}$]. At this time, the operation of the inverse dynamics InverseDynamics (W) for converting "W" into "U" is represented as follows.

$$U = \text{InverseDynamics}(W) \quad (61)$$

Additionally, the operation of the forward dynamics ForwardDynamics (U) for converting "U" into "W" is represented as follows.

$$W = \text{ForwardDynamics}(U) \quad (62)$$

The above described operations using the respective editing capabilities are performed via a Graphical User Interface (GUI). That is, the specification of the encoded movement data to be edited, the selection of an editing capability, the setting of values, etc. are performed by instructing the editing capabilities represented by buttons on a screen using a pointing device such as a mouse, etc. A display device displays the movement being edited and the movement resulting from the editing operation on its screen, and keeps a user informed of editing status for ease of visibility.

According to this embodiment, a B-spline function which is currently considered to be optimal is used as a basis function for approximating movement data. However, an arbitrary function may be normally used. For example, an RBF (Radical Base function) may be used as a basis function. Furthermore, not only a living thing but also an arbitrary mobile object such as an automobile, airplane, robot, etc. can be a measurement target of movement data.

According to the present invention, movement data can be efficiently stored by encoding the movement data provided as time series data. Additionally, various editing processes are performed for the encoded movement data, thereby generating also new movement data different from the provided movement data. Therefore, reusability of movement data is improved.

What is claimed is:

1. A data converting device, which uses a computer, for storing time series movement data obtained by measuring a movement of an arbitrary object, and performing information processing using the movement data, comprising:

an approximating device approximately representing the movement data with a weighted addition of smooth and local basis functions, and generating an array of weighting coefficients of the weighted addition;

a storing device storing the array of weighting coefficients as code data corresponding to the movement data; and an editing device generating new code data by extracting the code data from said storing device and changing the array of weighting coefficients of the code data, and restoring movement data corresponding to the new code data, the new code data representing a movement different from the movement of the arbitrary object.

2. The data converting device according to claim 1, wherein said approximately device uses a smooth and local function as at least one of the basis functions.

3. The data converting device according to claim 2, wherein said approximating device represents the movement data measured in a predetermined period of time as matrix data, solves an equation representing the matrix data by multiplying the array of weighting coefficients and a matrix whose elements are values of the basis functions, and obtains the array of weighting coefficients.

4. The data converting device according to claim 3, wherein said approximating device uses B-spline functions as the basis functions, and represents the matrix of the basis functions by using values of the B-spline functions in the predetermined period.

5. The data converting device according to claim 3, wherein said approximating device solves the equation by using either of a method employing a pseudo inverse matrix and a Gaston elimination method.

6. A data converting device, which uses a computer, for performing information processing for outputting an image of a virtual character by using time series movement data obtained by measuring a movement of an arbitrary object, comprising:

an encoding device generating code data by encoding the movement data;

a storing device storing the code data; and an editing device generating new code data by extracting the code data from said storing device and changing the code data, the new code data representing a movement different from the movement of the arbitrary object;

a restoring device restoring movement data corresponding to the new code data; and an outputting device generating the image of the virtual character by using restored movement data, and outputting the image.

7. The data converting device according to claim 6, wherein said encoding device approximately represents the movement data with a with a weighted addition of arbitrary basis functions, generating an array of weighting coefficients of the weighted addition, and storing the array of weighting coefficients in said storing device as the code data.

8. The data converting device according to claim 6, wherein said editing device includes a coordinate transforming device transforming the code data described in a first coordinate system into code data described in a second coordinate system.

9. The data converting device according to claim 6, wherein said editing device includes a time converting device performing at least either of data conversion for converting code data representing a movement into code data representing joint torque of a living thing by using inverse dynamics, and data conversion for converting the code data representing the joint torque of the living thing into the code data representing the movement by using forward dynamics.

10. The data converting device according to claim 6, wherein said editing device includes a space converting device performing at least one of data conversions such as a translation, rotation, and a size change of the code data.

11. The data converting device according to claim 6, wherein said editing device includes a converting device performing at least one of data conversions such as a division, connection, and fusion of the code data.

12. The data converting device according to claim 6, wherein said editing device includes a coefficient adjusting device changing an arbitrary weighting coefficient included in the code data.

13. The data converting device according to claim 6, wherein said editing device includes a converting device performing at least either of data conversion converting code data representing a movement into code data representing joint torque of a living thing by using inverse dynamics, and data conversion converting the code data representing the joint torque of the living thing into the code data representing the movement by using forward dynamics.

14. The data converting device according to claim 6, further comprising:

an interface device for performing at least either of an encoding process performed by said encoding device and an editing process performed by said editing device interactively with a user via graphical user interface.

15. A data converting device, which uses a computer, for performing information processing for outputting an image of a virtual character by using time series movement data obtained by measuring a movement of an arbitrary object, comprising:

a compressing device generating compressed data by compressing the movement data;

a storing device storing the compressed data;

an editing device generating new compressed data by extracting the compressed data from said storing device and changing the compressed data, the new code data representing a movement different from the movement of the arbitrary object;

a restoring device restoring movement data corresponding to the new compressed data; and an outputting device generating the image of the virtual character by using restored movement data, and outputting the image.

16. A data converting device, which uses a computer, for storing time series movement data obtained by measuring a movement of an arbitrary object, and performing information processing by using the movement data, comprising:

a storing device storing code data corresponding to the movement data;

an editing device generating new code data by extracting the code data from said storing device and changing the code data, the new code data representing a movement different from the movement of the arbitrary object;

a restoring device performing a weighted addition of smooth and local basis functions by using the new code data as an array of weighting coefficients, and approximately restoring movement data corresponding to the new code data; and an outputting device generating an image by using restored movement data, and outputting the image.

17. A computer-readable storage controlling a computer storing time series movement data obtained by measuring a movement of an arbitrary object and performing information processing by using the movement data, and comprising a process of:

approximately representing the movement data with a weighted addition of smooth and local basis functions, and generating an array of weighting coefficients of the weighted addition;

storing in a storing device the array of weighting coefficients as code data corresponding to the movement data; and generating new code data by extracting the code data from said storing device and changing the array of weighting coefficients of the code data, and restoring movement data corresponding to the new code data, the new code data representing a movement different from the movement of the arbitrary object.

18. A computer-readable storage medium for recording a program for a computer which performs information processing for outputting an image of a virtual character using time series movement data obtained by measuring a movement of an arbitrary object, the program directing the computer to perform:

generating code data by encoding the movement data;

storing the code data;

generating new code data by changing the code data, the new code data representing a movement different from the movement of the arbitrary object;

restoring movement data corresponding to the new code data; and generating the image of the virtual character by using restored movement data, and outputting the image.

19. A computer-readable storage controlling a computer storing time series movement data obtained by measuring a movement of an arbitrary object and performing information processing by using the movement data, and comprising a process of:

storing in a storing device code data corresponding to the movement data;

generating new code data by extracting the code data from said storing device and changing the code data, the new code data representing a movement different from the movement of the arbitrary object;

performing a weighted addition of smooth and local basis functions by using the new code data as an array of weighting coefficients, and approximately restoring movement data corresponding to the new code data; and generating an image by using restored movement data, and outputting the image.

20. A process of converting data, comprising:

obtaining time series movement data by measuring a movement of an arbitrary object;

approximately representing the movement data with a weighted addition of smooth and local basis functions, and generating an array of the weighting coefficients of the weighed addition;

storing in a storing device the array of weighting coefficients as code data corresponding to the movement data;

generating new code data by extracting the code data from said storing device and changing the array of weighting coefficients of the code data, the new code data representing a movement different from the movement of the arbitrary object;

performing a weighted addition of smooth and local basis functions by using the new code data as an array of weighting coefficients, and approximately restoring movement data corresponding to the new code data; and performing information processing by using restored movement data.

21. A data converting method, comprising:

obtaining time series movement data by measuring a movement of an arbitrary object;

generating code data by encoding the movement data;

generating new code data by changing the code data, the new code data representing a movement different from the movement of the arbitrary object;

restoring movement data corresponding to the new code data; and generating an image of a virtual character by using restored movement data, and displaying the image on a screen.

22. A process of converting data, comprising:

obtaining time series movement data by measuring a movement of an arbitrary object; storing in a storing device code data corresponding to the movement data;

generating new code data by extracting the code data from said storing device and changing the code data, the new code data representing a movement different from the movement of the arbitrary object;

performing a weighted addition of smooth and local basis functions by using the new code data as an array of weighting coefficients, and approximately restoring movement data corresponding to the new code data; and generating an image using restored movement data, and displaying the image on a screen.

23. A data converting device, which uses a computer, for storing time series movement data obtained by measuring a movement of an arbitrary object, and performing information processing using the movement data, comprising:

an approximating device approximately representing the movement data with a weighted addition of smooth and local basis functions, and generating an array of weighting coefficients of the weighted addition;

a storing device storing the array of weighting coefficients as code data corresponding to the movement data; and an editing device generating new code data by extracting the code data from said storing device, editing the code data without restoring the code data, and restoring movement data corresponding to the new code data.

* * * * *

UNITED STATES PATENT AND TRADEMARK OFFICE
CERTIFICATE OF CORRECTION

PATENT NO. : 6,359,621 B1
DATED : March 19, 2002
INVENTOR(S) : Maeda et al.

It is certified that error appears in the above-identified patent and that said Letters Patent is hereby corrected as shown below:

Column 22,
Line 38, delete claim 2 in its entirety;
Line 41, delete "claim 2" and insert -- claim 1 --

Column 23,
Line 10, delete "with a" (second occurrence);
Line 10, delete "arbitrary";
Line 11, before "basic functions" insert -- smooth and local --;

Column 26,
Line 9, after "objects;" begin a new paragraph;
Line 39, insert Claim 24, -- 24. A data converting device, which uses a computer, for storing time series movement data obtained by measuring a movement of an arbitrary object, and performing information processing using the movement data, comprising:
    an approximating device approximately representing the movement data with a weighted addition of B-spline functions, and generating an array of weighting coefficients of the weighted addition;
    a storing device storing the array of weighting coefficients as code data corresponding to the movement data; and
    an editing device generating new code data by extracting the code data from said storing device and editing the code data, and restoring movement data corresponding to the new code data. --

Signed and Sealed this

Twenty-ninth Day of October, 2002

*Attest:*

*Attesting Officer*

JAMES E. ROGAN
*Director of the United States Patent and Trademark Office*